US009866670B2

(12) United States Patent
Pelly et al.

(10) Patent No.: US 9,866,670 B2
(45) Date of Patent: Jan. 9, 2018

(54) MOBILE GEOGRAPHIC APPLICATION IN AUTOMOTIVE ENVIRONMENT

(71) Applicant: GOOGLE INC., Mountain View, CA (US)

(72) Inventors: Nicholas Julian Pelly, Manly (AU); Andrew Foster, Naremburn (AU)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 15/189,954

(22) Filed: Jun. 22, 2016

(65) Prior Publication Data

US 2016/0381199 A1     Dec. 29, 2016

Related U.S. Application Data

(60) Provisional application No. 62/183,607, filed on Jun. 23, 2015.

(51) Int. Cl.

| | |
|---|---|
| *H04M 1/725* | (2006.01) |
| *G01C 21/36* | (2006.01) |
| *G08G 1/0968* | (2006.01) |
| *H04L 12/26* | (2006.01) |
| *H04L 29/08* | (2006.01) |
| *H04W 4/00* | (2009.01) |
| *H04W 4/02* | (2009.01) |

(52) U.S. Cl.
CPC ...... *H04M 1/72527* (2013.01); *G01C 21/362* (2013.01); *G08G 1/096883* (2013.01); *H04L 43/16* (2013.01); *H04L 67/02* (2013.01); *H04W 4/001* (2013.01); *H04W 4/025* (2013.01)

(58) Field of Classification Search
CPC .......... H04M 1/72527; H04M 1/6041; H04W 4/008; G01S 5/0263
USPC ......................... 455/41.2, 456.1, 457, 456.3
See application file for complete search history.

(56) References Cited

U.S. PATENT DOCUMENTS

| | | | |
|---|---|---|---|
| 2009/0005070 A1 | 1/2009 | Forstall et al. | |
| 2011/0009127 A1* | 1/2011 | Spjuth | H04W 4/02 455/456.1 |
| 2014/0068010 A1* | 3/2014 | Nicholson | B60K 35/00 709/219 |
| 2015/0088420 A1 | 3/2015 | Foster et al. | |

(Continued)

OTHER PUBLICATIONS

International Search Report and Written Opinion for Application No. PCT/US2016/037853, dated Nov. 9, 2016.

*Primary Examiner* — Sonny Trinh
(74) *Attorney, Agent, or Firm* — Marshall, Gerstein & Borun LLP

(57) ABSTRACT

A portable device is configured to provide geographic information to a head unit of a vehicle equipped with a display device. One or more processors determine a user context related to a geographic location and detect that the portable device has been communicatively coupled to the head unit of a vehicle. The one or more processors transmit to the head unit, without an express user command, a request that the head unit accept data from the portable device for output via the display device. In response to receiving an indication that that the request has been granted, the one or more processors cause information related to the geographic location to be displayed via the display device, without an express user input at the portable device.

16 Claims, 25 Drawing Sheets

(56) References Cited

U.S. PATENT DOCUMENTS

2016/0069699 A1* 3/2016 Chen .................. G01C 21/3682
                                                                                 701/426

* cited by examiner

MOBILE GEOGRAPHIC APPLICATION IN AUTOMOTIVE ENVIRONMENT

CROSS-REFERENCE TO RELATED APPLICATIONS

The present application is a non-provisional application claiming priority to U.S. Provisional Patent Application No. 62/183,607, filed Jun. 23, 2015, the disclosure of which is incorporated herein by reference in its entirety for all purposes.

FIELD OF TECHNOLOGY

This disclosure relates to geographic software applications and, more particularly, to using geographic applications in an automotive environment.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Today, many vehicles are equipped with head units that include displays, touchscreens, speakers, microphones, and/or other components for receiving user input and providing output. Some of these head units also include wired and/or wireless ports to communicate with other electronic devices in the vehicle.

SUMMARY

Generally speaking, the techniques described below allow a portable user device, such as a smartphone, to safely and efficiently co-operate with various components in an automotive environment. The portable user device can provide video, audio, and sensor data to the head unit of a vehicle for display and/or playback via the user interface ("UI") devices embedded in the vehicle. Moreover, the portable user device can receive sensor data, environmental data and other data indicative of the current condition of the vehicle, user commands, and other information from the head unit to improve the quality of information provided to the user.

One aspect of these techniques is a communication protocol that allows the portable device to access various components of the vehicle, such as one or more displays, audio speakers, speed sensors, or temperature sensors, for example, using a messaging scheme independent of the make or brand of the vehicle. To this end, the portable device and the head unit can exchange messages in which components of the vehicle are referenced and described in a flexible format as low-level devices. In this manner, the portable device can implement much of the logic for interacting with vehicle components, and the head unit conversely need not support complicated logic for describing and presenting vehicle components to the portable device. Further, the portable device can interact with various vehicles having different configurations and software capabilities. Still further, the portable device can implement discovery services to identify components available at the vehicle, rather than rely on pre-configured settings.

Another aspect of these techniques is management of navigation focus, or substantially exclusive use of video, audio, tactile, and other output components of the head unit for the purposes of providing navigation instructions. When both the head unit and the portable device are capable of providing navigation instructions, the head unit and the portable device, when connected, can effectively compete for the output components of the head unit. To avoid driver confusion, the portable device or the head unit can transmit a message to the other device, requesting navigation focus. The other device can reject or grant the request. In an example implementation, the policy regarding focus allocation is implemented in the head unit in accordance with the requirements of the vehicle manufacturer.

Yet another aspect of these techniques is management of video focus, or substantially exclusive use of the one or several displays of the head unit. The portable device and the unit can exchange messages to determine whether the video output from the portable device ("projected UI") or from a component operating within the head unit ("native UI") should be displayed via the head unit. The projected UI can include various screens generated by software applications executing on the portable device, which can include mapping applications, calling applications, music applications, etc. The native UI can include such sensor readings as speed and fuel level, for example, as well as video feed from the rear review camera, safety announcements (e.g., "seat belt is off"). The management of the video focus can be based on user commands, safety factors, such as when the head unit acquires video focus to display video from the rear view camera, negotiations between the portable device and the head unit, etc.

Still another aspect of these techniques is management of audio focus, or substantially exclusive use of the one or several audio output components embedded in the vehicle. The portable device and the head unit can manage audio focus independently of video focus and/or navigation focus. To support such scenarios as playing back a text-to-speech (TTS) notification while the head unit is streaming audio from the portable device or playing a navigation instruction received from the portable device while the head unit is playing FM radio, the portable device and the head unit can exchange messages to negotiate audio focus allocation. In some cases, the messages indicate not only requests to gain or lose focus but also "ducking" conditions, types of audio, etc. The portable device and the head unit can support multiple simultaneous audio channels for different types of audio data.

The techniques of this disclosure further allow the portable device and the head unit, each of which may include multiple sensors of varying capability and accuracy, to combine some of the sensor output to improve positioning, measurements of wheelspeed, compass readings, etc. In some scenarios, the portable device and the sensor can implement heuristic techniques to detect misalignment in estimating similar kinematic parameters such as speed, based on different sensor readings. For example, the portable device can report small amounts of movement based on its sensor readings, while the head unit can access gear information from the vehicle and report that the vehicle is stopped. The portable device and/or the head unit can determine that the user is likely moving the portable device within the vehicle, and adjust the sensor readings accordingly.

Further, according to the techniques of this disclosure, the portable device can generate a simulated route for testing various functions of the system including the portable device and the head unit, and provide the simulated route to the head unit. The head unit in turn can provide the parameters of the simulated route to other components of the vehicle, generate various sensor readings, and provide the sensor readings to the portable device. Thus, the portable device can generate a simulated position of the vehicle and cause the head unit to provide the simulated position to components that the portable device cannot access directly, and that can be affected by the simulated position. For example, the headlights of the vehicle may automatically turn on based in part of the current position of the vehicle.

Another aspect of these techniques are safety features such as the lockout of the portable device when the portable device is connected to head unit. According to one implementation, when the portable device provides projected UI to the head unit, the portable device does not allow the user to access other functionality of the portable device without unplugging the portable device. Thus, the user cannot access a text messaging application, which makes driving unsafe, without losing access to the projected UI and, in some cases, without disrupting music streaming or other ongoing interactions between the portable device and the head unit.

Another aspect of the techniques is the ability of the portable device to selectively lock out features of the projected and/or native UI in view of environmental conditions. The head unit notifies the portable device of at least some of these environmental conditions, such as the current speed of the vehicle, and various events such as windshield wiper activation. In view of certain notifications received from the head unit, the portable device can determine that certain UI features have become unsafe, unlikely to be used, or simply unnecessary. More generally, the portable device can adjust its output and/or the output of the head unit in view of various environmental conditions. In one example scenario, the portable device deactivates the display of a keyboard in response to detecting that the vehicle is moving. In another example scenario, the portable device detects that the vehicle is moving at a certain speed, and that it is probably raining as the windshield wipers are on. The portable device limits the list of geographic search results to one page, even though a multi-page list of results is available, so as to prevent the user from scrolling or paging through the list while driving.

Still another aspect of these techniques is changing the visual presentation of a digital map in view of the connection between the portable device, where the digital map is rendered, and the head unit, where the digital map is presented. The head unit can report various vehicle- or head-unit-specific parameters when the portable device connects to the head unit, and the portable device can determine which colors should be used and whether certain geographic features should be displayed, for example. The portable device can render digital map by applying different styles, or sets of visual attributes, to the same map feature geometry to generate different visualizations of the same geographic area. Thus, using transparent color schemes defined by a certain style, the portable device can effectively hide geographic features that are typically less relevant in an automotive context, such as public transportation data. As another, a certain style can specify thicker lines for roads when the digital map is being used in an automotive context. The portable device can automatically switch between different styles when the user connects to the portable device to the head unit or, conversely, when the user unplugs the portable device from the head unit.

Another aspect of these techniques is continuity between executing certain tasks executed on a portable device and executing related tasks on a head unit of a vehicle, when the portable device detects a new connection to the head unit. For example, when a user explicitly or implicitly selects a certain geographic location via her portable device and later connects the portable device to the head unit, the portable device automatically triggers display of driving directions or other information related to the geographic location via the head unit. To this end, the portable device can request control of the display device embedded in the head unit. Depending on the implementation and/or configuration of the head unit, the portable device can acquire the control automatically or upon the user confirming the transfer of control via the head unit.

At least some of these techniques discussed above can be used with self-driving vehicles. For example, a user can couple his or her portable device to the head unit of a self-driving vehicle to use the portable device as a source of navigation directions the vehicle can autonomously follow or multimedia content.

DETAILED DESCRIPTION OF THE DRAWINGS

I. Example Hardware and Software Architecture

Figure 1:
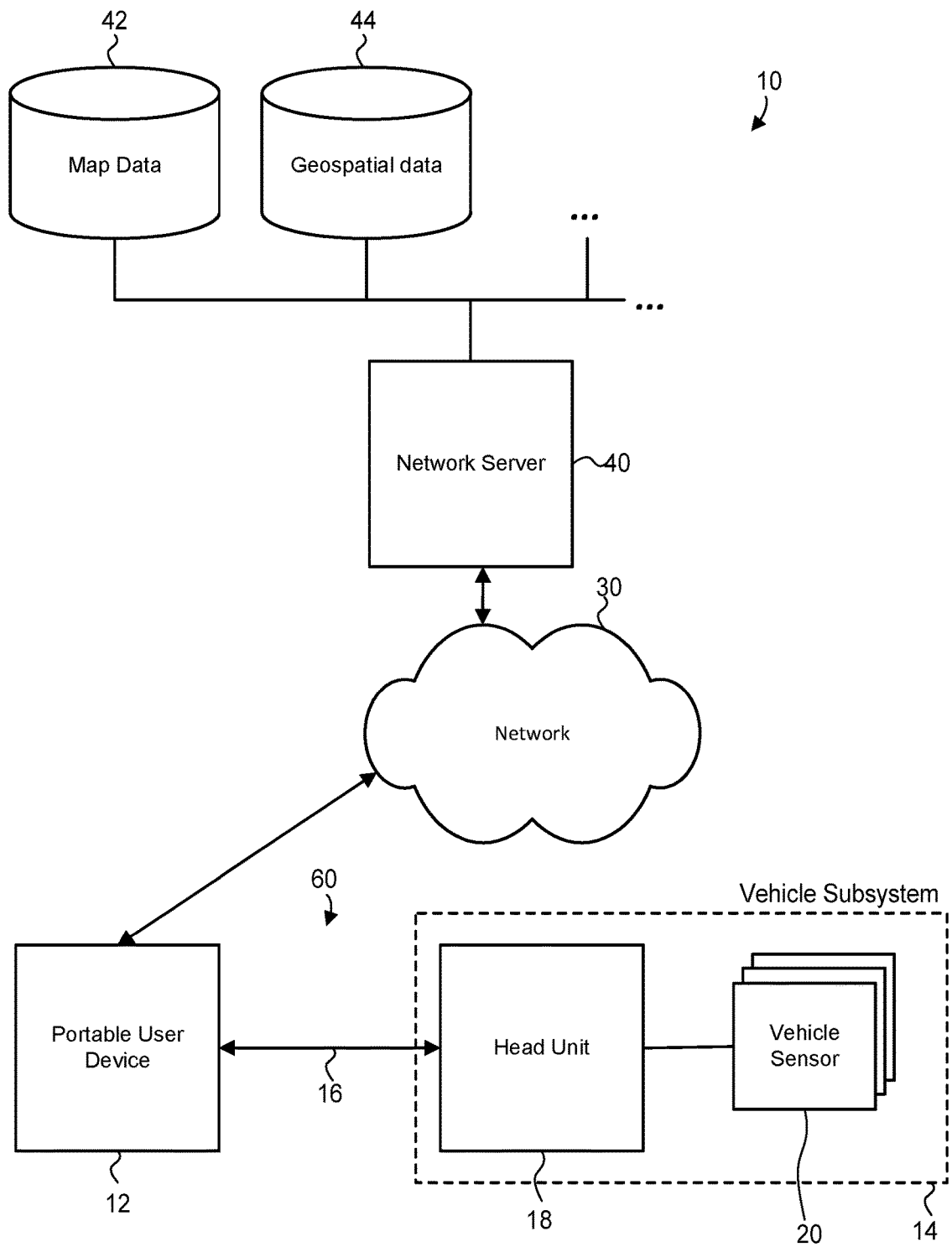
FIG. 1 is a block diagram of an example system in which a portable user device is configured to communicate with a head unit of a vehicle, and in which the portable user device is configured to receive map data, navigation data, and other types of geospatial data from a network server via a communication network.

Referring first to FIG. 1, an example communication system 10, in which some or all of the techniques outlined above can be implemented, includes a portable user device (or simply "portable device") 12 communicatively coupled to a vehicle subsystem 14 of a vehicle (not shown). The vehicle subsystem 14 can include a head unit 18 and a set of vehicle sensors 20. The portable user device 12 is configured to communicate with a network server 40 via a communication network 30, which can be a wide area network such as the Internet. The network server 40 can be connected to several databases including a map database 42 and a geospatial database 44.

The portable user device 12 can be any portable computing device such as a smartphone, a tablet computer, a wearable computer, etc. An example implementation of the portable user device 12 is discussed with reference to FIG. 2. The portable user device 12 communicates with the head unit 18 via a communication link 16, which may be wired (e.g., Universal Serial Bus (USB) or wireless (e.g., Bluetooth)). The portable user device 12 can also communicate with various content providers, servers, etc., via a wireless communication network such as a fourth- or third-generation cellular network (4G or 3G, respectively).

In operation, the portable user device 12 provides the head unit 18 with information related to navigation, which may include digital map images, text, and audio. The head unit 18 can display this information via a display such as a touchscreen. Further, the head unit 18 can include various hardware input controls such as buttons, knobs, etc. An example implementation of the head unit 18 is discussed with reference to FIG. 3.

The head unit 18 can receive data from the set of vehicle sensors 20 during operation. The set of vehicle sensors 20 can include, for example, a global positioning system (GPS) module to determine the current position of the vehicle in which the head unit 18 is installed, an inertial measurement unit (IMU) to measure the speed, acceleration, and current orientation of the vehicle, a barometer to determine the altitude of the vehicle, etc. Although FIG. 1 depicts the set of sensors 20 as being coupled to the head unit 18, it is noted that the sensors 20 can also be integral components of the head unit 18.

In some implementations, the communication link 16 operates as a component of an automotive link layer 60, which can be regarded as a service that provides a communication protocol for one or more components of the portable user device 12 to communicate with one or more components of the head unit 18. More generally, the automotive link layer 60 supports various functions that enable interactions between the portable user device 12 and the head unit 18. As discussed in more detail below, the automotive link layer 60 can include one or more software components of the portable device 12 and one or more components of the head unit 18.

The network server 40 can be implemented as a single device or a group of servers (e.g., a set of front-end servers and a set of back-end servers). Moreover, depending on the implementation, the network server 40 can be implemented as a single network node associated with the all the databases in the group of databases (e.g., as shown in FIG. 1), or as separate network nodes associated with each of the databases in the group of databases. The network server 40 can include processing hardware such as one or more processors configured to execute instructions stored in a non-transitory computer-readable memory, for example. The network server 40 also can include a network interface using which the network server 40 can communicate to remote hosts such as the portable device 12 and the databases 42 and 44. The network interface can support various communication protocols for wired and/or wireless communications.

In the example configuration of FIG. 1, the portable user device 12 communicates with the network server 40 to access map data provided by the map database 42 and geospatial data provided by the geospatial database 44. The databases 42 and 44 can be implemented in any suitable manner, such as relational databases implemented in dedicated storage devices, dedicated groups of storage devices, or on the network server 40, for example. The map database 42 can store descriptions of geometry and location indications for various natural geographic features (e.g., rivers, mountains, forests) as well as artificial geographic features (e.g., roads, buildings, parks). The map data can include, among other data, vector graphics data, raster image data, and text data. The geospatial database 44 can store information regarding various points of interest (e.g., monuments, museums, landmark buildings), businesses (e.g., restaurants, hotels, stores), train stations and bus stops, boundaries of neighborhoods, and other geographic entities. Descriptions of geographic entities can include any number of search terms based on which the data can be indexed or otherwise organized for quick search and retrieval.

The portable device 12 can operate in an online mode, in which the portable device 12 has a sufficiently reliable network connection to the network server 40, with a sufficiently high capacity. In the online mode, the user device 12 requests map data, geospatial search results, other geographic data, as well as non-geographic data such as music streams, from the network server 40. When the portable device 12 cannot establish a network connection to the network server 40 due to poor network coverage, for example, or when the user of the portable device 12 explicitly disables the network connection, the portable device 12 can operate in an offline mode. The portable device 12 can store offline road map data, geospatial data, and other data in cache, which can be implemented in the persistent memory of the portable device 12, for example.

In general, the example communication system 10 can include processing hardware of any suitable type, configured to implement the techniques of this disclosure. The processing hardware can include one or more processors on one or more computing devices, one or more servers, a distributed network, etc.

Figure 2:
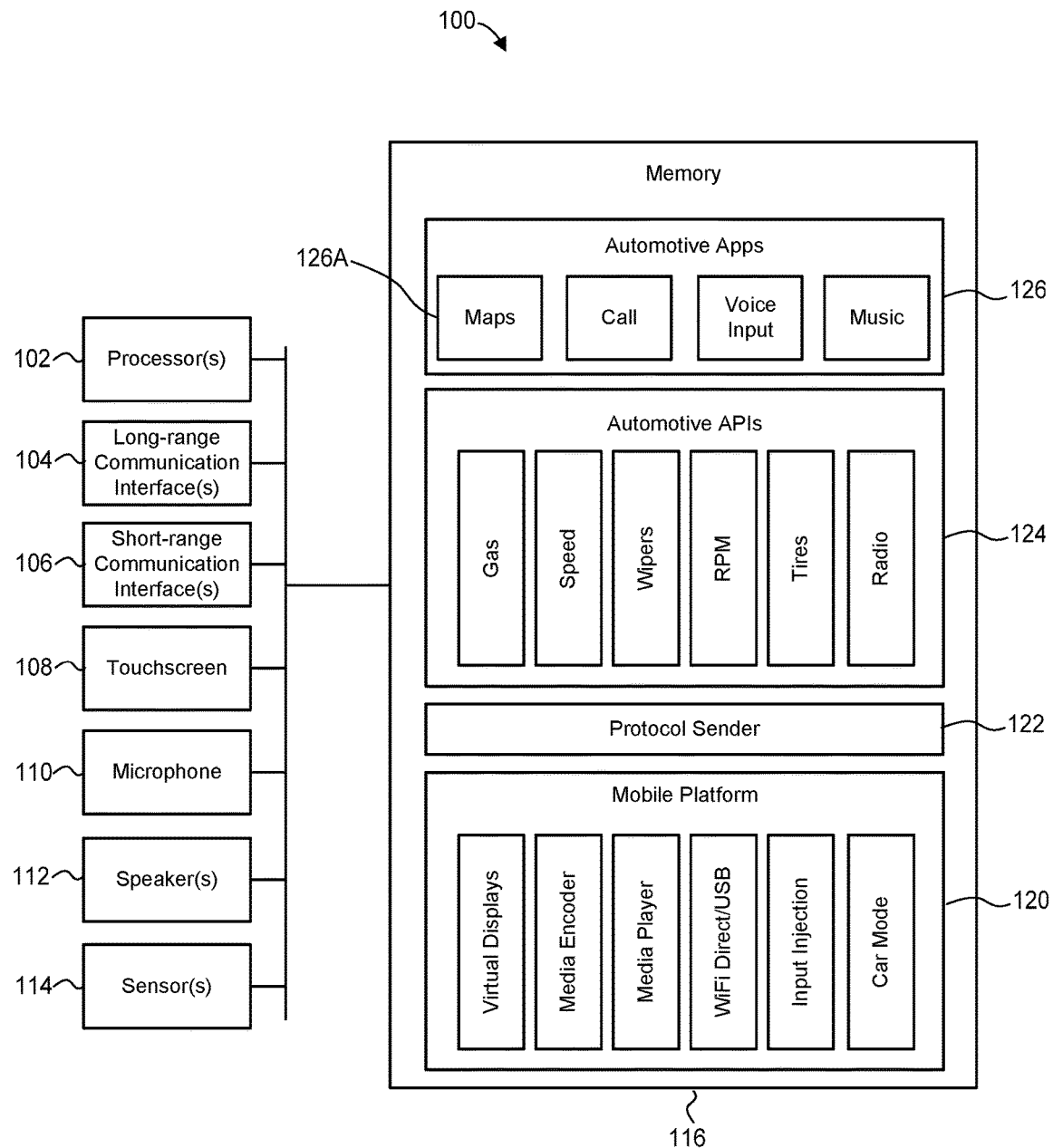
FIG. 2 is a block diagram of an example portable user device that can operate in the system of FIG. 1.

Now referring to FIG. 2, a portable user device 100 can operate in the communication system 10 (as the portable user device 12, for example) or in another suitable computing environment. The portable user device 100 includes one or more processor(s) 102, such as a central processing unit (CPU), for example. The portable user device 100 also includes a memory 116 readable by the one or more processor(s) 102. The memory 116 can include one or several persistent memory modules such as a flash memory, hard disc, optical disc, etc. and/or one or several non-persistent memory modules such as a Random Access Memory (RAM) module. In some implementations, the one or more processor(s) 102 also include a Graphics Processing Unit (GPU) to more accurately and efficiently render graphics content. Further, the portable user device 100 can include one or more long-range communication interface(s) 104 that support a scheme such as 802.11 (Wi-Fi®) or a suitable telephony protocol, for example, and one or more short-range communication interface(s) 106 that support a scheme such as Bluetooth®, Wi-Fi Direct®, or USB, for example.

The portable user device 100 further includes various input and output devices such as a touchscreen 108, a microphone 110, and speaker(s) 112. Additionally, the portable user device 12 includes one or more sensor(s) 114, which may include a GPS sensor, an acceleration sensor, a gyro sensor, a temperature sensor, a proximity sensor, etc. The portable user device 100 in some implementations can determine its current location using the communication interface(s) 104 and 106 to locate Wi-Fi hotspots having known positions and perform triangulation. The components 102-114 can be interconnected via a digital bus, for example.

The memory 116 stores a variety of software components or modules including a mobile platform 120, a protocol sender 122, automotive application programming interfaces (APIs) 124, and software applications including automotive applications (Apps) 126. The software modules can include compiled instructions and/or instructions in any suitable programmable language interpretable at runtime. The software modules 120-126 execute on the one or more processor(s) 102.

The mobile platform 120 can include an operating system (OS) that runs the portable user device 100. As such, the mobile platform 120 includes various drivers that support the functions of the operating system. For example, the mobile platform 120 includes a virtual displays driver, which defines how information or data (e.g., text, images, alphanumeric characters, etc.) is displayed by the portable user device 100 (e.g., via the touchscreen 108). As another example, the mobile platform 120 includes a media encoder and a media player driver. The media encoder operates to encode and/or decode media signals (e.g., video, audio, etc.), while the media player driver defines how these media signals are played or broadcasted by the portable user device 100 (e.g., via the speaker(s) 112). As yet another example, the mobile platform 120 includes a Wi-Fi Direct/USB driver, which specifies how communication schemes, such as Wi-Fi Direct or USB, are processed by the portable user device 100 (e.g., via the communication interface(s) 104 and 106). As a further example, the mobile platform 120 includes an input injection driver, which defines how user inputs are received or acquired by the portable user device 100 (e.g., via a virtual keyword on the touchscreen 108). In addition, the mobile platform 120 includes a car mode driver, which specifies how the portable user device 100 can be enabled to support in-car usage such as making calls, using navigation, listening to music, etc., while driving the vehicle.

The protocol sender 122 can operate as part of the automotive link layer 60 of FIG. 1, for example. The protocol sender 122 can implement a communication protocol for exchanging sensor data, user commands, device-to-device commands, audio commands, audio streams, video streams, and other data with another device, such as the head unit 18 of FIG. 1. The protocol sender 122 can plug into the interfaces of the mobile platform 120, such as video, audio, connectivity, input, etc. Some of the features of the communication protocol are discussed in more detail below.

The portable device 100 can communicate with a head unit of a vehicle via the short-range communication interface(s) 106. The portable user device 100 and the head unit can support one or several protocols layered over the general-purpose protocol supported by the short-range communication interface(s) 106 and the corresponding short-range communication interface of the head unit (such as Bluetooth®, Wi-Fi Direct®, or USB). As a more specific example, the protocol sender 122 and the protocol receiver 230 (see FIG. 3 below) can support a protocol discussed in more detail below, layered over Android Open Accessory Protocol (AOAP), which in turn can be layered over USB. In one such implementation, the portable device 100 operates as a USB accessory, and the head unit operates as a USB host.

The automotive APIs 124 can receive and transmit data via the protocol sender 122. These APIs define a standardized interface for developers to create software applications that utilize the head unit of a vehicle to interact with the driver. More particularly, the automotive APIs 124 allow the portable user device 100 to access various parameters, functions, or services of a vehicle. In particular, with reference to FIG. 1, the automotive APIs 124 can allow the portable user device 100 to access data or information gathered by the set of vehicle sensors 20. As illustrated in FIG. 2, the example set of automotive APIs 124 includes a gas query interface that allows the device 100 to receive information regarding the current gas level of the vehicle and, in some implementations, more robust information such as fuel efficiency, historical fuel consumption, etc. The automotive APIs 124 further include a speed query interface to retrieve information regarding the current speed of the vehicle, a wipers query interface to determine whether the windshield wipers are currently active (and, in some implementations, at what rate), a revolution per minute (RPM) query interface to retrieve data regarding the RPM readings of the vehicle, a tires query interface to determine the conditions of the tires, and a query radio interface to determine the status of the radio component embedded in the vehicle. More generally, the set of automotive APIs 124 can include any suitable functions for retrieving current and/or historical data from the vehicle.

In general, the automotive APIs 124 can be implemented for use with any suitable programming language, including those currently known in the art. Further, the automotive APIs 124 can be provided in different versions for different respective operating systems.

The automotive applications 126 can provide applications that can operate in an automotive environment and, in some cases, other environments. For example, the automotive applications 126 can include a geographic/mapping application 126A that processes map data stored offline or received from an online database (e.g., the database 42 of FIG. 1) and generates interactive digital maps for display via the touchscreen 108 and/or the head unit of a vehicle. The geographic/mapping application 126A can also receive and process geospatial queries, such as requests to find nearby restaurants or gas stations, retrieve and display navigation directions, etc. Other examples of the automotive applications 126 can include a calling application for placing and/or receiving phone calls via the long-range communication interface 104, a voice input application that permits users to enter voice commands to control the device 100, and a music application that allows users to listen to music using the device 100. The music application can stream music in an online mode or playback audio files (not shown) stored in the memory 116.

Figure 3:
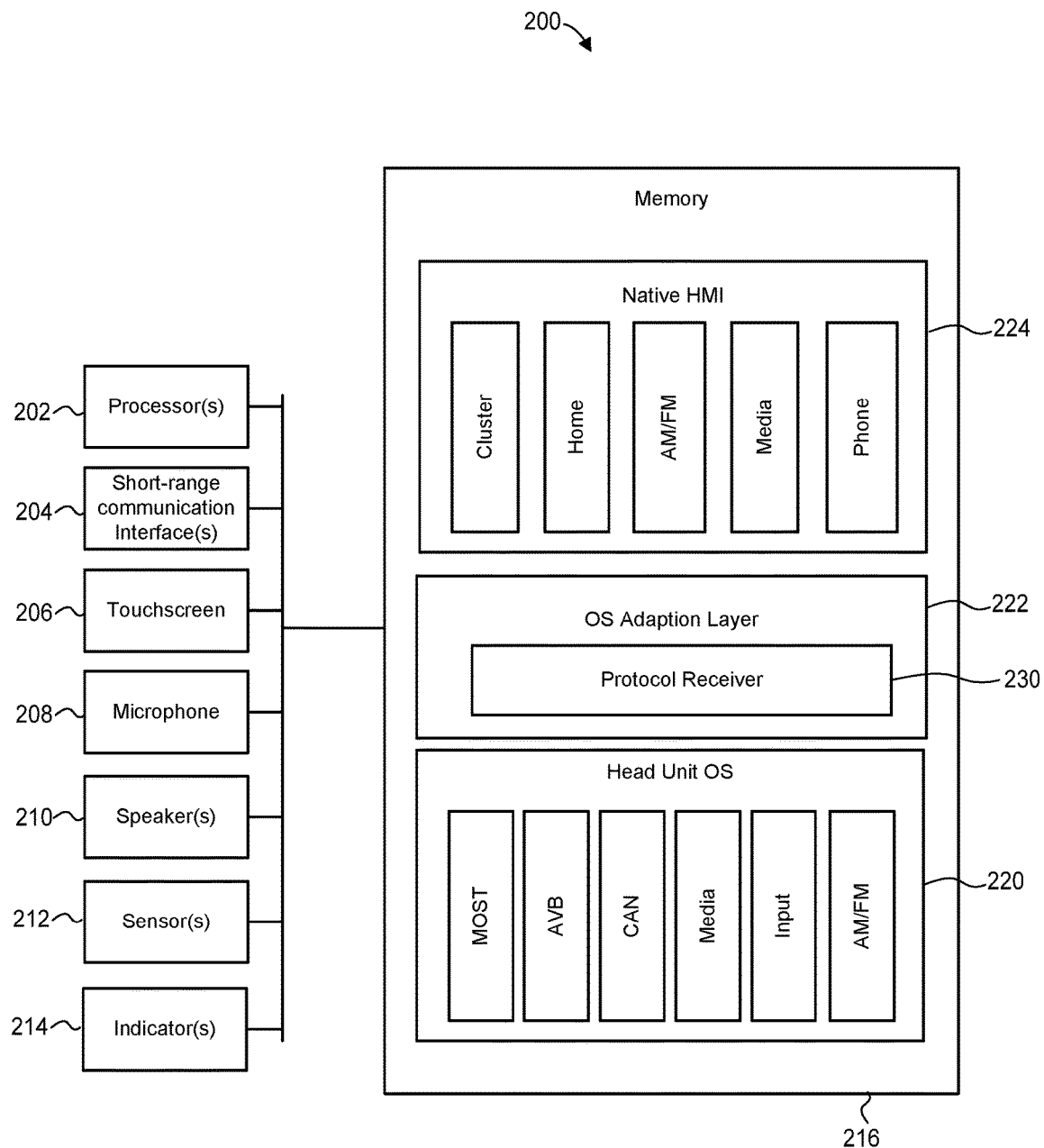
FIG. 3 is a block diagram of an example head unit that can operate in the system of FIG. 1.

Next, FIG. 3 illustrates an example head unit 200 which can operate as the head unit 18 of FIG. 1, for example. The head unit 200 includes one or more processor(s) 202, a memory 216, which can be generally similar to the processor(s) 102 and the memory 116 of FIG. 2. The head unit 200 can communicate with a portable device, such as the portable device 100, via the one or more short-range communication interface(s) 204, which can include wired and/or wireless. Similar to the short-range communication interface(s) 106, the short-range communication interface(s) 204 can support Bluetooth®, Wi-Fi Direct®, USB, or another suitable communication protocol.

The head unit 200 also can include a touchscreen 206, which typically is larger, and has higher density, than the touchscreen 108 of the portable device 100. The touchscreen 206 can serve as the main console display of the head unit 200. In other implementations, the head unit 200 includes a display that does not receive touch input, and receives input via buttons, knobs, and other input devices. Further, the head unit 200 in some implementations can include multiple display devices. Similarly, the head unit 200 can include a microphone 208, which can be a high-quality microphone disposed in the housing of the head unit or elsewhere in the vehicle.

Further, the head unit 200 can have access to sensors 212, which can include a GPS location sensor, a dead reckoning position sensor, a mechanical speed sensor, a compass heading sensor, such as a gyroscope, an accelerometer, a thermometer, etc. Further, the head unit 200 can have access to indicators 214, such as windshield wiper status indicators, car gear indicators, window lock indicators, etc. In general, the head unit 200 can include, or have access to, suitable any number of components that reports measurements, settings, configurations, and parameters of the vehicle.

The memory 216 also stores a variety of software modules including a head unit OS 220, an OS adaptation layer 222 and a native human-machine-interface (HMI) 224. Each of the modules 220-224 can be implemented, for example, using software instructions executable on the one or more processor(s) 202.

The OS adaptation layer 222 includes a protocol receiver 230, which can implement the same protocol as the protocol sender 122 of FIG. 2. In this manner, the head unit 200 can communicate with the portable device 100 or another computing device that implements the protocol sender 122. The protocol receiver 230 and the protocol sender 122 can operate as parts of the automotive link layer 60 of FIG. 1.

The native HMI 224 includes functions for accessing various functions of the vehicle. For example, the native HMI 224 can support functions for invoking the home screen that displays basic vehicle information (e.g., gear, speed, fuel level), activating the AM/FM radio, placing a phone call. Some of the functions of the HMI 224, such as the phone function, access the protocol receiver 230 to establish a communication link with the portable device.

Figure 4:
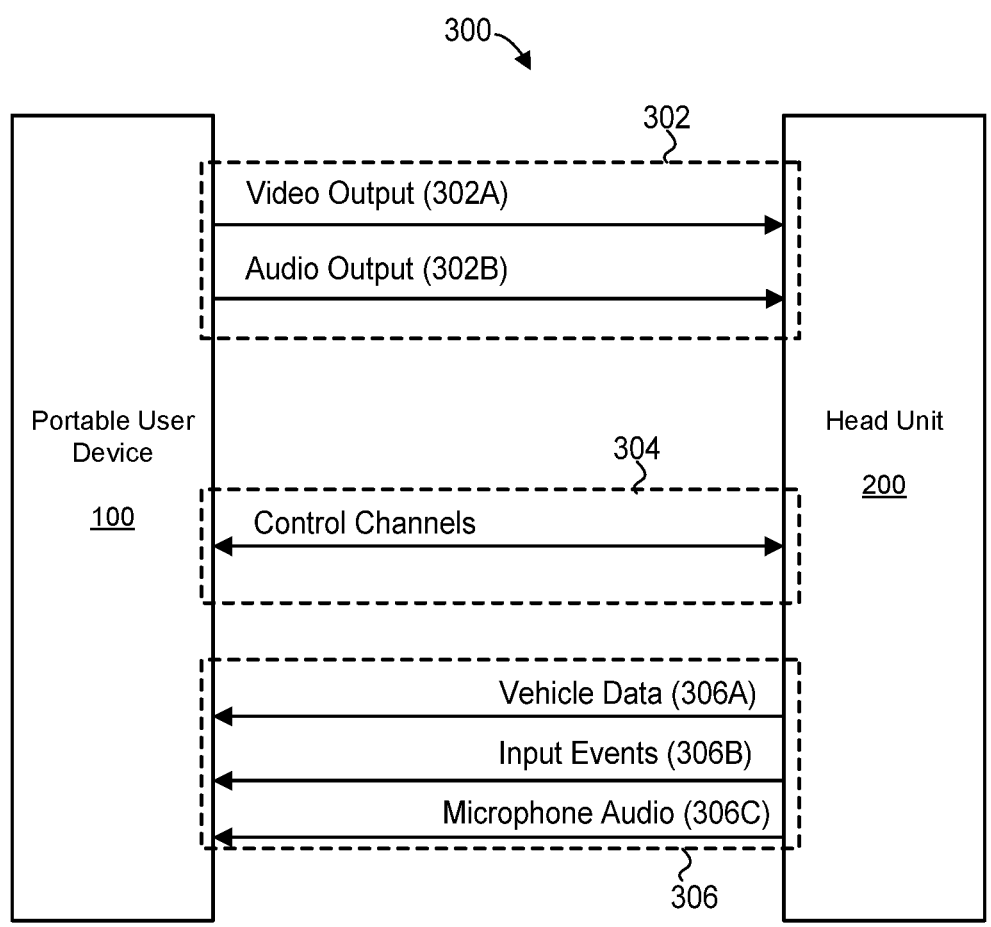
FIG. 4 is a block diagram of an example set of channels via which the portable device and the head unit of FIG. 1 can exchange data.

In general, the portable device 100 and the head unit 200 can exchange several types of data via separate channels. In an example set of channels 300 depicted in FIG. 4, the automotive applications 126 provide output to the head unit 200 via video and audio output channels 302. The protocol sender 122 and the protocol receiver 230 can exchange messages via a control channel 304. Vehicle data, user input events, microphone audio, and other data from the head unit OS 220 can travel to the portable device 100 via channels 306.

More particularly, the control channel 305 can be a bidirectional channel that supports messages related to link initialization, set up of other channels such as channels 302 and 306, etc. The video output channel 302A can be a device-to-vehicle channel that supports H.264 video from the portable device 100 to the head unit 200 for display via the main console display. The audio output channel 302B can be a device-to-vehicle channel that carries audio from the portable device 100 to the head unit 200 for output via the vehicle speakers. The audio can be AAC with 44 k/48 k, AAC or PCM for 16 k, etc.

The vehicle data channel 306A can carry vehicle-associated data such as GPS data, wheelspeed, and other data from the head unit 200 to the portable device 100. The input events channel 306B can be a vehicle-to-device channel that carries input events to the portable device 100 from input devices in the vehicle, such as touchscreen(s), buttons, controllers, etc. The microphone audio channel 306C can be a vehicle-to-device channel that carries, to the portable device 100, audio captured by the vehicle microphone.

The set of channels 300 in some implementations also can include channels via which the portable device 100 and the head unit 200 can exchange information about such other services as FM radio, HVAC, etc.

II. Communication Protocol for Accessing Components of a Vehicle

Generally speaking, applications running on such portable devices as the portable device 12 (or 100) can operate in feature-rich application frameworks, are easily upgradeable, have better connectivity than typical embedded services, support user profiles, etc. On the other hand, the head unit 18 (or 200) illustrated above typically has a larger, high-quality, and well-positioned video display, as well as high fidelity audio, and a larger battery. In some implementations, the head unit 18 has a main console display as well as additional displays, and multiple speakers. Moreover, the head unit 18 or 200 has access to high-quality sensor data, such as the sensors 212.

To allow each of the portable device 12 and the head unit 18 to benefit from the capability of the other device, the automotive link layer 60 supports messages according to which the components of the vehicle are presented to the portable device 12 as a collection of low-level hardware devices. The automotive link layer 60 accordingly can discover and access these components of the vehicle as if these components were peripherals of the portable device 12. For convenience, these components of the vehicle sometimes are referred to as components of the head unit 200, due to the ability of the head unit 200 to access these components. It will be understood, however, that some of these components can be physically disposed elsewhere in the vehicle and outside the housing of the head unit 200.

The automotive link layer 60 can set up multiple services for component-specific communications. As used herein, a service is an endpoint for communication between the portable device and the head unit. The automotive link layer 60 can discover each component of the head unit 200 separately and associate each discovered component with a unique endpoint.

In general, vehicles today have very diverse input types: rotary controllers, jogs, button, dials, touch pads, touchscreens, etc. Some vehicles include multiple instances of certain input devices. For example, a vehicle can include rotary controllers in front and in the back seat. A vehicles also can include many types of sensors, such as a GPS unit, a wheelspeed sensor, a compass, an inside temperature sensor, an outside temperature.

Referring back to FIG. 3, the head unit 200 can enumerate (or have enumerated) its hardware. In the example configuration of FIG. 3, the automotive link layer 60 can enumerate its single touchscreen 206 as display #0. In another configuration, the automotive link layer 60 enumerates multiple display devices, each of which may have its own resolution, color depth, and physical location. The automotive link layer 60 can discover each of these displays separately and generate respective addresses for these displays. The head unit 200 then can generate descriptions of these displays devices in accordance with the protocol of the automotive link layer 60.

Figure 5A:
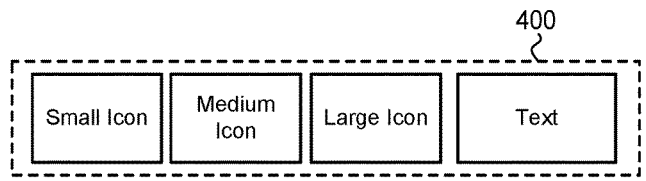
FIG. 5A is a block diagram of an example message which the portable device of FIG. 1 can send to a vehicle to request service discovery.

For example, referring to FIG. 5A, the portable device 100 can send a message 400 including a service discovery request to the head unit 200 via the control channel 304 (see FIG. 4), for example. As illustrated in FIG. 5A, the message 400 can include several icons of different sizes, one or several which the head unit 200 can display as a selectable control via its main console display. When the user taps on or otherwise activates the icon, the head unit 200 can switch to the projected mode to the native mode of display, for example. The message 400 also can include a text to be displayed via the main console for the user, to indicate to the user that the portable device 100 is in communication with the head unit 200.

In response to the message 400, the head unit 200 can determine which components are available, enumerate the components, and generate descriptions of these components that conform to the general format of messages 5B and 5C. In a sense, the message 400 advertises the services available at the head unit 200.

Figure 5B:
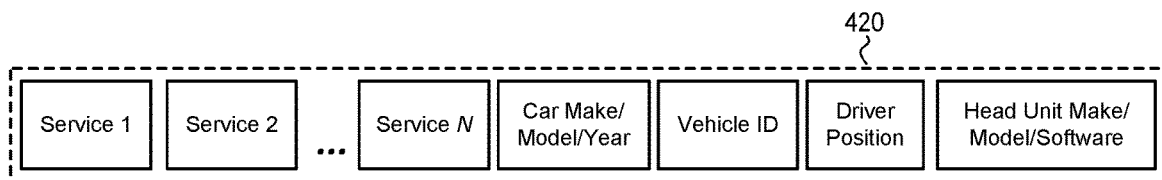
FIG. 5B is a block diagram of an example message which the vehicle can send in response to the message of FIG. 5.
Figure 5C:
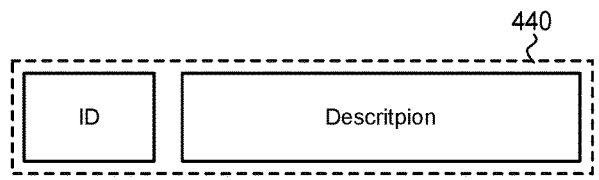
FIG. 5C is a block diagram of an example data unit that describes a service of any type, which can be included in the message of FIG. 5B.

A message 420 of FIG. 5B includes descriptions of service endpoints, each of which can be formatted as a data unit 440 illustrated in FIG. 5C. In general, the message 420 can describe any number of services of various types. In addition to descriptions of services, the message 420 can indicate vehicle make, model, year, identifier, driver position (right or left), hardware type and software versions of the head unit, etc.

The data unit 440 can specify a substantially unique identifier for the service and include a description of the service. The description in turn can include an indication of the type of service (e.g., sensor source service, media sink service, input source service, media source service) and a description conforming to the corresponding structure. One such example structure, describing a media sink service, is illustrated in FIG. 5D.

Figure 5D:
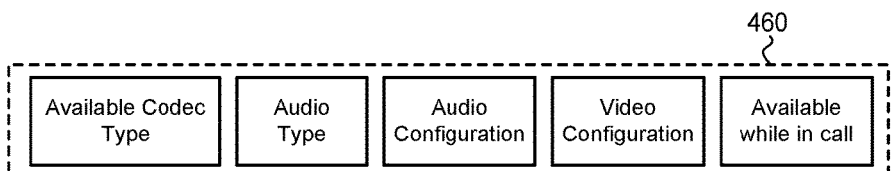
FIG. 5D is a block diagram of an example data unit that describes a media sink service, which can be included in the data unit of FIG. 5C.
Figure 5E:
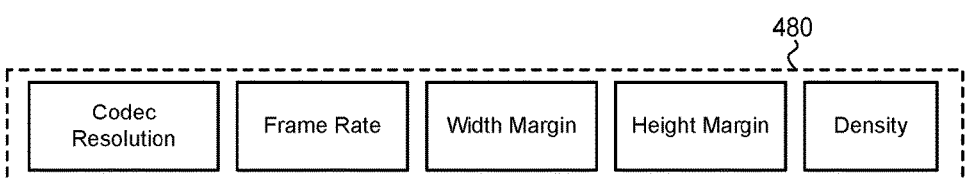
FIG. 5E is a block diagram of an example data unit that describes video configuration, which can be included in the data unit of FIG. 5D.

A data unit 460 of FIG. 5D includes an indication of an available codec type, an audio type, a description of audio configuration and/or a description of a video configuration, etc. As a further example, the video configuration field included in the data unit 460 conform to the format of a data unit 480, describing video configuration, illustrated in FIG. 5E. The data unit 480 can include an indication of codec resolution, a frame rate, a width margin, etc.

More generally, messages which the portable device 100 and the head unit 200 can exchange can include numerous nested data units. The formats of FIGS. 5A-E provide a high level of flexibility and a high level of compatibility. Further, because the head unit 200 can describe many types of components in this manner, and provide detailed parameters for each component, the portable device 100 can implement extensive software logic for interacting with these components. Accordingly, the head unit 200 need not support complex, component-specific software to facilitate interactions between these components and the head unit 100.

III. Managing Navigation Focus Between a Portable Device and a Head Unit

In some implementations of the system 10, both the portable user device 12 and the head unit 18 are capable of generating turn-by-turn navigation instructions at the same time. As discussed above, the portable user device 12 can generate navigation instructions in an online mode using data received from the network server 40, or an offline mode using cached data. The head unit 18 can implement an on-board navigation system that uses road data stored in the memory of the head unit 18, for example.

When not in communication with the vehicle subsystem 14, the portable user device 12 can generate navigation instructions for display and/or audio playback via the user interface of the user device 12, while the head unit 18 can display and/or announce "competing" navigation instructions using the user interface elements embedded in the vehicle, such as the touchscreen 206 and/or speakers 212 depicted in FIG. 3. In this case, the portable user device 12 and the head unit 18 compete for the driver's attention. When the user connects the portable user device 12 to the head unit 18, the entities 12 and 18 can compete for resources of the head unit 18. More particularly, the portable user device 12 can attempt to display information via the head unit 18, while the head unit 18 can attempt to display its own, "native" visual output.

To avoid providing duplicative or contradictory navigation instructions when the portable user device 12 is connected to the head unit 18, the automotive link layer 60 implements a technique for negotiating navigation focus, which can include a substantially exclusive use of one or more user video and/or audio output devices of the head unit 18 for the purpose of providing navigation instructions. To this end, the portable device 12 and head unit 18 can exchange messages to manage the navigation focus, as discussed with reference to FIGS. 6A and 6B.

Figure 6A:
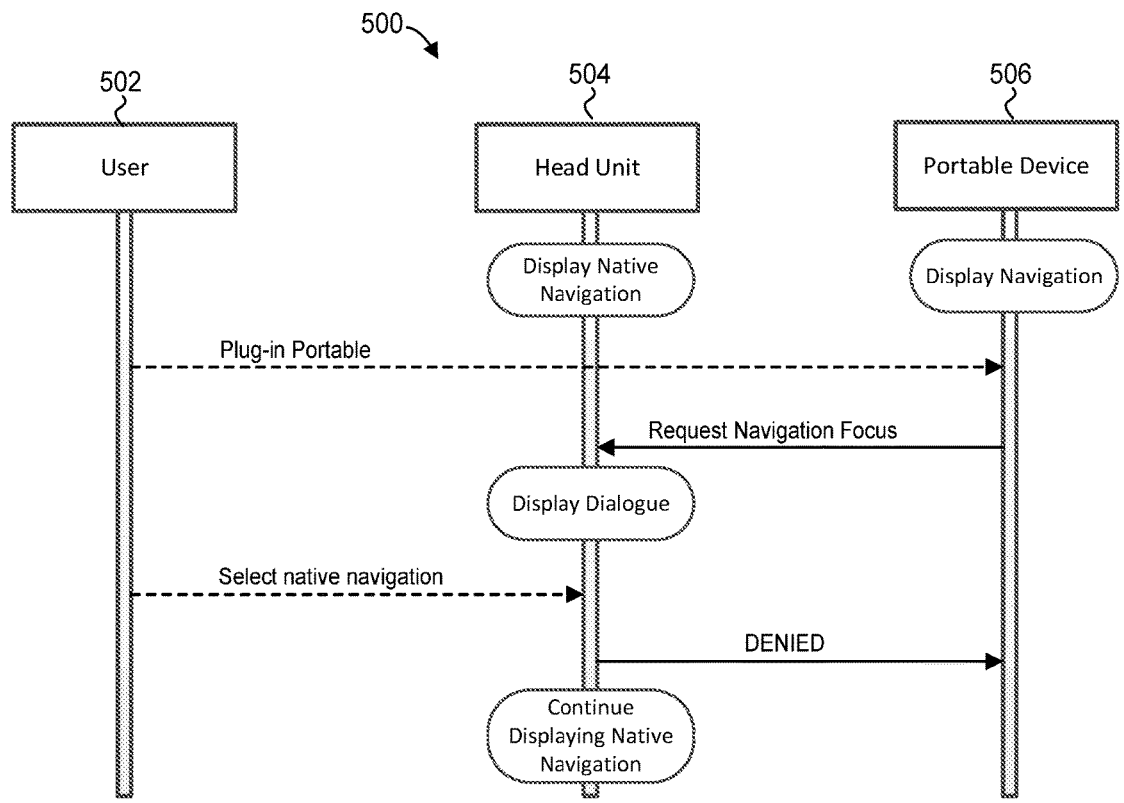
FIG. 6A is a message flow diagram of an example scenario in which the head unit displays native navigation instructions and denies a request for navigation focus from the portable device.
Figure 6B:
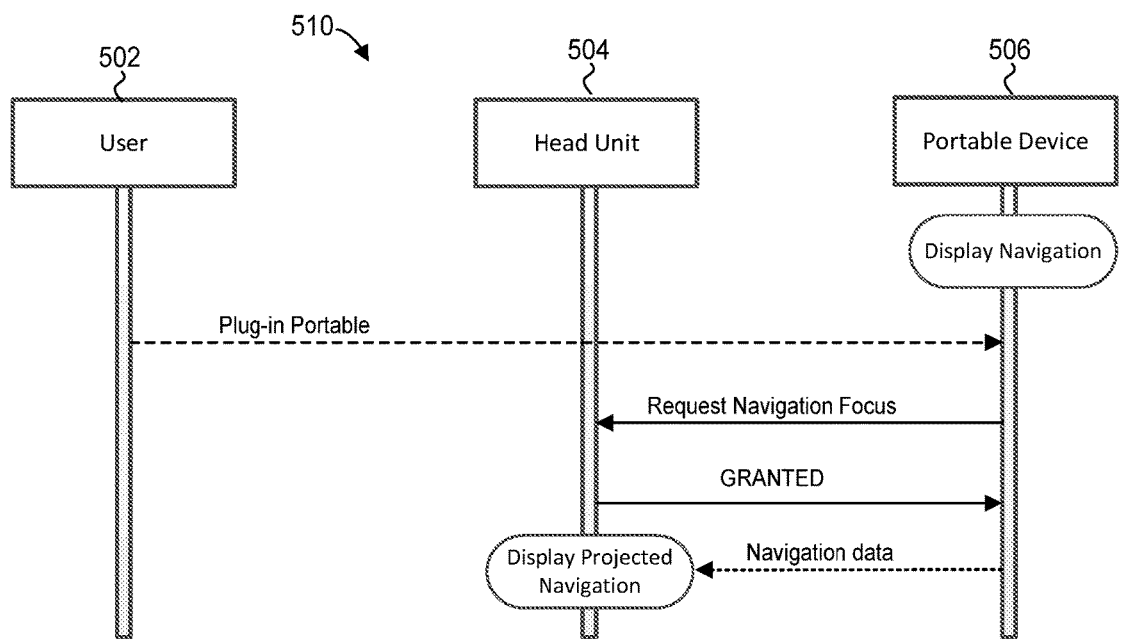
FIG. 6B is a message flow diagram of an example scenario in which the head unit grants a request for navigation focus from the portable device and displays projected navigation directions.

In general, FIGS. 6A and 6B illustrate example messaging between a user 502, a head unit 504, and a portable device 506. The head unit 504 can correspond to the head unit 200 of FIG. 3 and/or the head unit 18 of FIG. 1, for example. The portable device 506 can correspond to the portable device 100 of FIG. 2 and/or the portable device 12 of FIG. 1, for example.

In the scenario illustrated in FIG. 6A, while the head unit 504 and the portable device 506 are disconnected, the head unit 504 displays native navigation instructions generated by the on-board navigation system of the vehicle, for example, while the portable device 506 displays navigation instructions generated by a geographic application operating in the portable device 506, such as the application 126A of FIG. 2.

The user then plugs in, or connects wirelessly, the portable device 506 to the head unit 504. The portable device 506 can automatically request navigation focus by sending a Request Navigation Focus message to the head unit 504. According to one implementation, the portable device 506 generates the Request Navigation Focus message in response to determining that (i) a navigation session is in progress and (ii) the portable device 506 is now connected to the head unit 504.

The head unit 504 can display a dialogue via its main display console, for example, to determine whether the user prefers native navigation or portable device navigation. Additionally or alternatively, the head unit 504 can request the selection from the user by generating an audio announcement, for example. When the user elects portable device navigation, the head unit 504 can grant the request, deactivate native navigation, and begin to display projected navigation from the portable device 506. In the scenario of FIG. 6A, however, the user elects native navigation, and the head unit 504 denies the request from the portable device 506. The head unit 504 then continues to display native navigation directions.

In the scenario of FIG. 6B, the head unit 504 does not display navigation directions at the time when the user connects the portable device 506 to the head unit 504. Accordingly, the head unit 504 grants the request for navigation focus and begins displaying projected navigation directions.

In another implementation, the head unit 504 can implement a policy to automatically prioritize either the head unit 504 or the portable device 506, and automatically grant to deny navigation focus requests in accordance with the policy. The head unit 504 may not display a dialogue in these cases. For example, the head unit 504 can be configured to unconditionally grant the request for navigation focus once the user connects the portable device 506 to the head unit 504.

In general, the head unit 504 and/or the portable device 506 can implement any suitable policies and/or user dialogues to prevent the head unit 504 and the portable device 506 from competing for the same audio, visual, tactile, etc. resources of the head unit 504 to present navigation instructions.

IV. Managing Video Focus Between a Portable Device and a Head Unit

In addition to navigation instructions, native visual output of the head unit 18 (or 300) can include indications of vehicle data such as speed, gear, fuel levels, temperature, etc., video feed from the rear review ("backup") camera, various announcement, such as "seat belt is off!" or "check tire pressure," and other information. The native visual output of the head unit 18 can be referred to "native UI."

The visual output of the portable device 12, provided to the vehicle subsystem 14 for display via the one or several screens of the head unit 18, can be referred to as "projected UI." In addition to navigation instructions discussed above, the projected UI can include various geographic information related to navigation (e.g., "gas station in 5 miles"), user interface controls of the geographic application 126A, controls for selecting music stations via the music application running on the portable device 12, UI controls for placing and receiving phone calls, and/or other suitable information.

To provide a safe and intuitive user interface to the driver and/or passenger of the vehicle, the automotive link layer 60 can implement a technique for negotiating video focus, or substantially exclusive use of one or more video output devices of the head unit 18 for the purpose of providing visual output.

To allocate video focus, the portable user device 12 and the head unit 18 can exchange messages to request video focus, grant or reject a request for video focus, notify the other device of focus loss, and otherwise negotiate and/or enforce video focus allocation. In some implementations, the automotive link layer 60 can ensure that video focus is mutually exclusive. In other words, either the portable user device 12 or the head unit 18 can provide visual output to the driver via the video resource(s) of the head unit 18, but not both.

According to one implementation, the head unit 18 implements policy decisions regarding allocation of video focus. The automotive link layer 60 can support messages using which the portable user device 12 requests video focus and the head unit 18 rejects the request or grants the request depending on the policy which can be car manufacturer-specific.

Several example scenarios in which a head unit and a portable device manage video focus are discussed next with reference to FIGS. 7A-7C. In these scenarios, a head unit 604 can correspond to the head unit 200 of FIG. 3 and/or the head unit 18 of FIG. 1, for example. The portable device 606 can correspond to the portable device 100 of FIG. 2 and/or the portable device 12 of FIG. 1, for example.

Figure 7A:
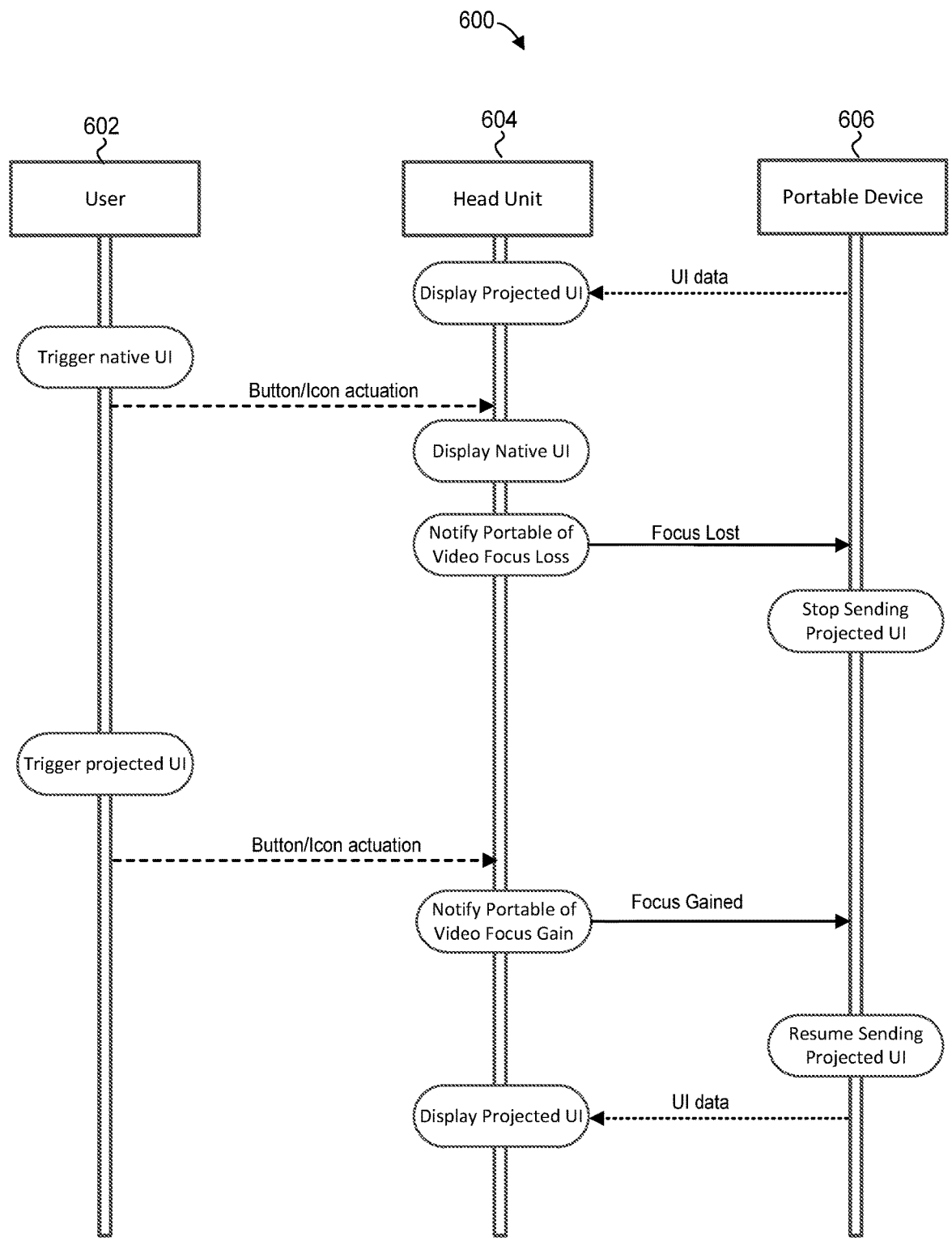
FIG. 7A is a message flow diagram of an example scenario in which the head unit switches between displays of native UI and projected UI in response to user commands.

Referring first to FIG. 7A, the portable device 606 at the beginning of scenario 600 displaying projected UI which can include an interactive menu of the geographic application, for example. The user 602 presses a button or otherwise actuates a control on the head unit 604 to switch the display to native UI of the head unit 604. For example, the user can press the Air Conditioning hardware button on the head unit 604, and the head unit 604 can provide a native UI for climate control. The head unit 604 in this case switches to native UI display without negotiating video focus with the portable device 606, and peremptorily notifies the portable device 606 of video focus loss. The portable device 606 stops sending projected UI to the head unit 604 upon receiving the command. At a later time, the user 602 operates the same or different control to selected projected UI, and the head unit 604 notifies the portable device 606 that the portable device 606 now has the video focus. In response, the portable device 606 resumes transmission of projected UI via the head unit 604.

Thus, in the scenario 600, the head unit 604 acquires and gives up video focus in response to a user action related to the head unit 604. In some situations, the head unit 604 also can acquire video focus for safety reasons.

Figure 7B:
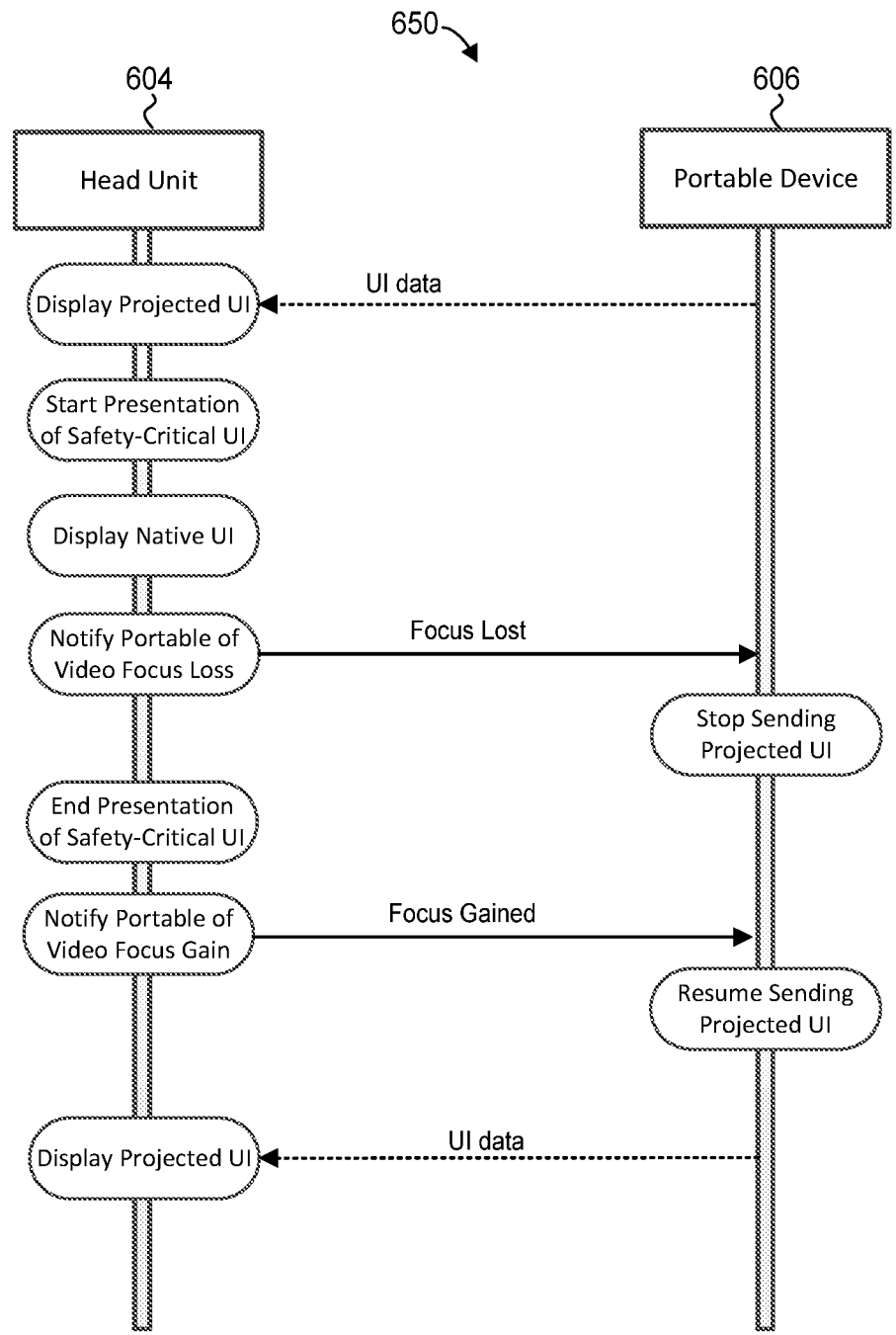
FIG. 7B is a message flow diagram of an example scenario in which the head unit switches between displays of native UI and projected UI in response to a safety-critical event.

For example, referring to FIG. 7B, the portable device 606 can display projected UI via the head unit 604 at the beginning of a scenario 650. The head unit 604 then detects that safety-critical UI must be displayed. For example, the user 602 may have shifted the vehicle transmission into REVERSE. The head unit 604 switches the display to native UI to display the backup camera. The head unit 604 also notifies the portable device 606 of the loss of video focus. Upon receiving the notification, the portable device 606 stops transmitting projected UI to the head unit 604.

The head unit 504 then completes the presentation of safety-critical UI. For example, the user 602 may have shifted the vehicle transmission into DRIVE. The head unit 604 notifies the portable device 606 that the portable device 606 has regained video focus. In response to this notification, the portable device 606 resumes transmission of projected UI to the head unit 604.

Further, the head unit 604 in some situations can switch between displays of native UI and projected UI in response to a request from the portable device 606. For example, a music streaming application can run on the portable device 606 while the head unit 604 and the portable device 606 are connected. The music streaming application may stream audio through the head unit 604 and not ask for video focus until the end of the playlist has been reached. As another example, a navigation application can similarly run without requesting video focus until the next turn in turn-by-turn instructions is reached.

Figure 7C:
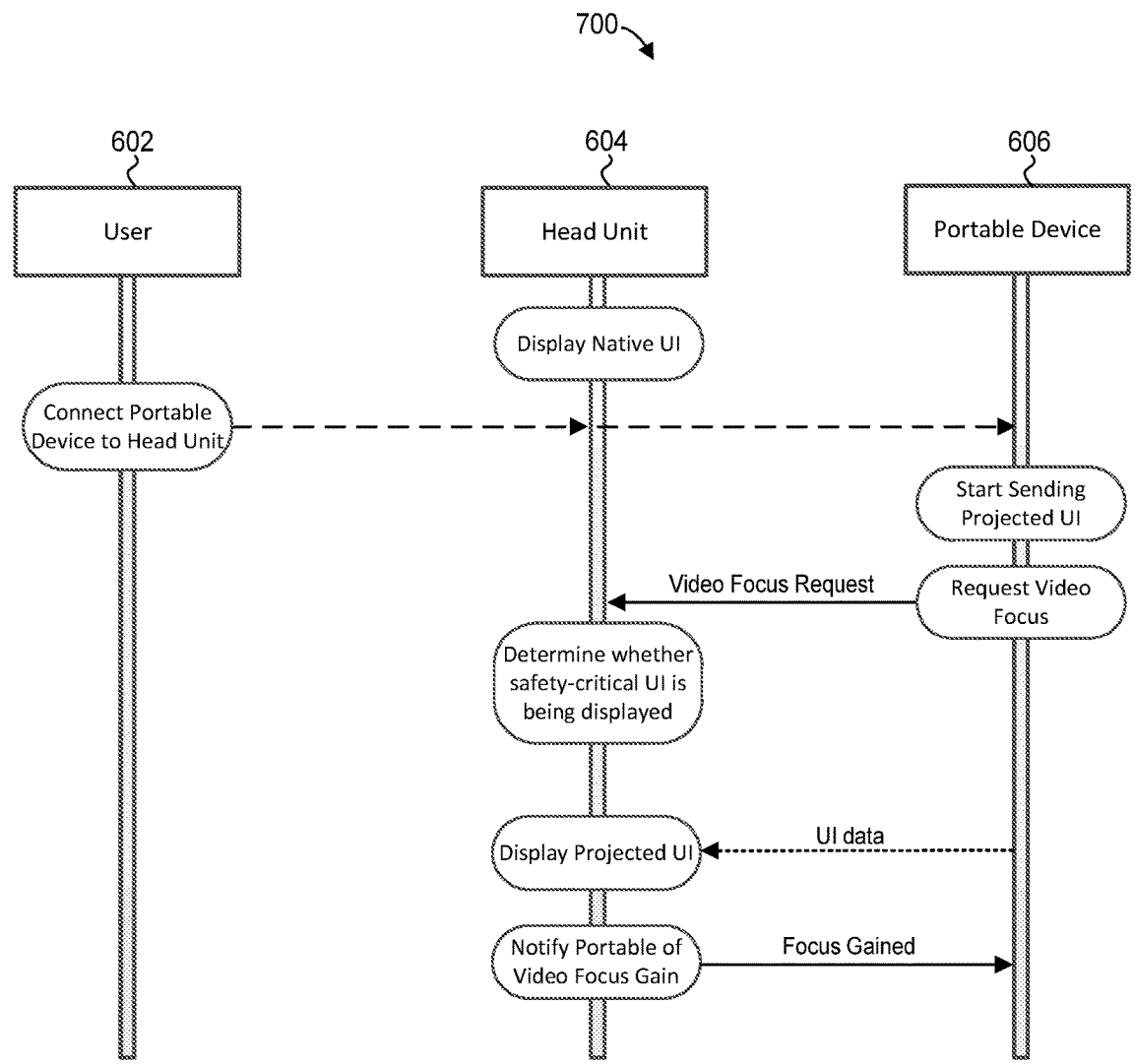
FIG. 7C is a message flow diagram of an example scenario in which the head unit switches between displays of native UI and projected UI in response to a request from the portable device.

As a more specific example, the head unit 604 at the beginning of example scenario 700 of FIG. 7C is displaying native UI, such as climate control and vehicle status. The user 602 connects the portable device 606 to the head unit 604. The portable device 606 is running a navigation application.

When the vehicle approaches an upcoming event (e.g., a turn) in the navigation directions generated by the navigation application on the portable device 606, the portable device 606 begins to send projected UI and requests a video focus. The head unit 604 confirms that the native UI is currently not displaying safety-critical information, such as the feed from the backup camera, and determines that the request for video focus should be granted. The head unit 604 then switches to projected UI to display the information from the portable device 606 regarding the upcoming event.

V. Managing Audio Focus

Referring back to FIG. 1, each of the portable device 12 and the vehicle subsystem 14 can implement complex audio management techniques. For example, the portable device 12 can support multiple software applications running in parallel, and each of these software applications can output one or more audio streams. The portable device 12 can implement various audio policies to co-ordinate audio between these applications and streams, such as automatically "ducking," or reducing the volume of, a notification stream when another application requests audio focus over the media stream.

The vehicle subsystem 14 also support multiple audio streams. These streams can include, for example, cabin audio (speakers directed at the entire cabin) and driver audio (directional speakers aimed at driver's head). Each of these audio streams may be directed to different speakers, and/or have different audio processing applied, and/or cause different audio policies to be implemented. For example, the vehicle subsystem 14 may also duck cabin audio when playing driver audio.

To coordinate audio between the two complex audio systems of the portable device 12 and the vehicle subsystem 14, the automotive link layer 60 can implement a technique for negotiating the allocation of audio focus. The audio focus can include substantially exclusive use of one or more audio output devices accessible to the head unit 18 for the purpose of providing audio output. As discussed above, a vehicle in general can include multiple speakers, disposed inside the head unit 18 or elsewhere inside the vehicle. The automotive link layer 60 can manage the audio focus independently of the video focus and navigation focus. More particularly, the automotive link layer 60 allows the portable device 12 and the head unit 18 to exchange audio focus messages, as illustrated in FIGS. 9A-G.

In an example implementation, the automotive link layer 60 operates on audio sources, which can correspond to logical endpoints that generate audio data and send data to audio streams. The automotive link layer 60 also operates on audio sinks, which can correspond to logical endpoints that receive audio content from an audio stream. An example audio sink is the set of in-vehicle speakers. Further, the automotive link layer 60 can operate on audio streams, which can correspond to named combinations of an audio source and an audio sink.

Figure 8:
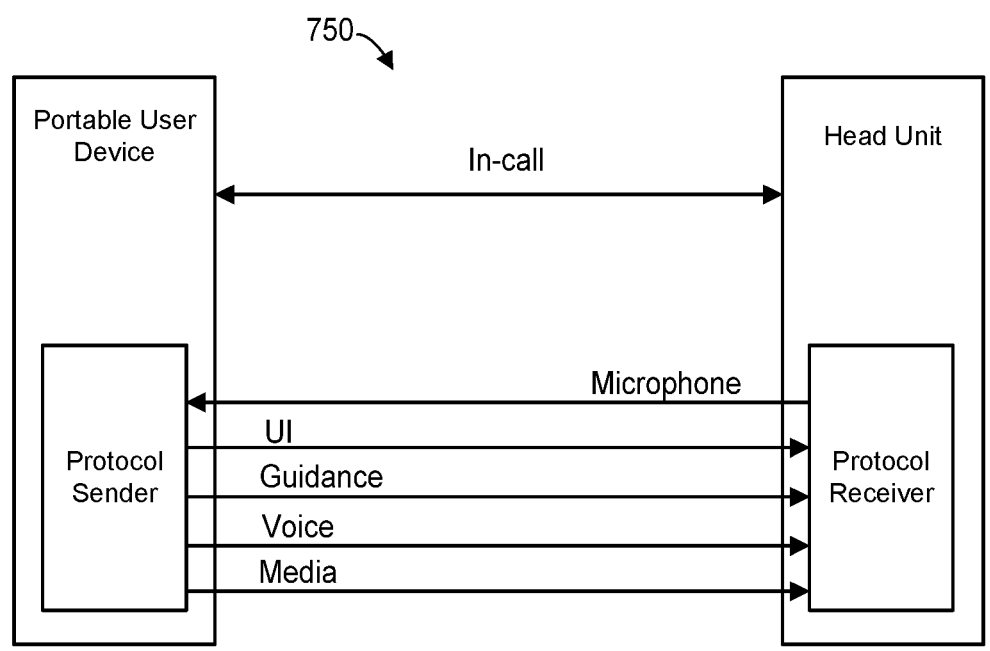
FIG. 8 is a block diagram of an example set of audio channels which the portable device and the head unit of FIG. 1 can set up.

As used herein, output audio streams refer to streams that are sent from the portable device 12 to the head unit 18, and input audio streams are send from the head unit 18 to the portable device 12. FIG. 8 illustrates an example set of audio channels which the automotive link layer 60 operating in the portable device 12 and the head unit 18 of FIG. 1 can set up. In an example implementation, a set of signals 750 includes an audio input stream for a microphone, one bidirectional audio stream for in-call Bluetooth audio, as well four audio output streams: a UI stream for user interface feedback data, a guidance stream for driver guidance, a voice stream for conversational voice), and a media stream for cabin media.

The portable device 12 and the head unit 18 can exchange messages to co-ordinate allocation of audio focus for each logical audio stream shared by the portable device 12 and the head unit 18. In this manner, the portable device 12 and the head unit 18 can coordinate multiple audio streams. One of the portable device 12 and the head unit 18 can operate as a "master" configured to receive requests for audio focus from the other one of the portable device 12 and the head unit 18, and reject or accept these requests in view of configuration, environmental factors, policies, etc.

Figure 9A:
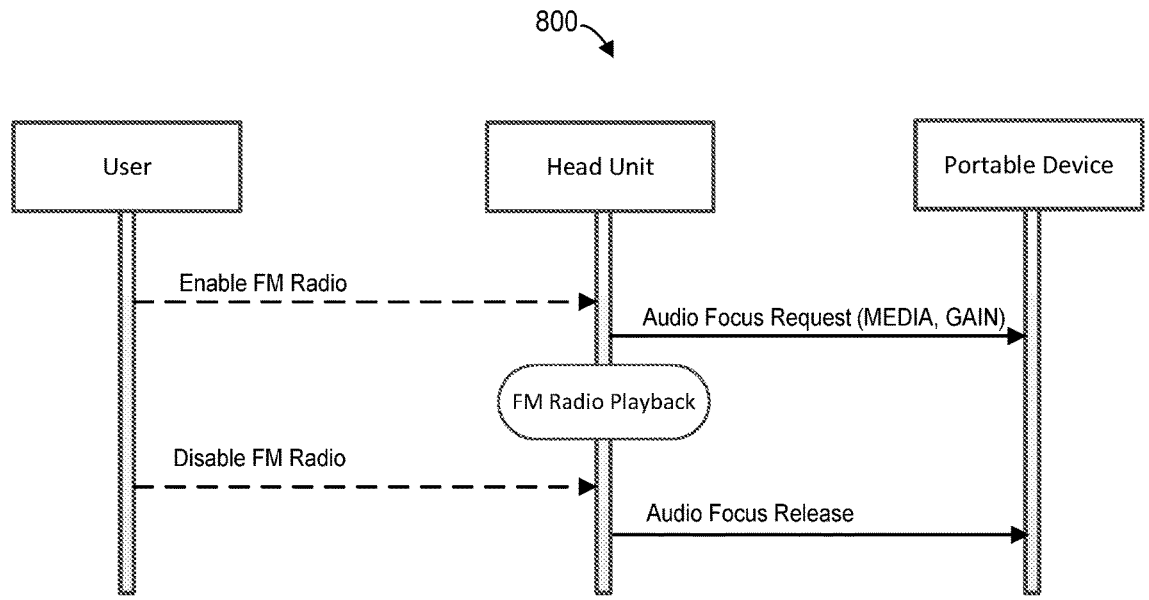
FIG. 9A is a message flow diagram of an example scenario in which the head unit acquires audio focus in response to a user command.
Figure 9B:
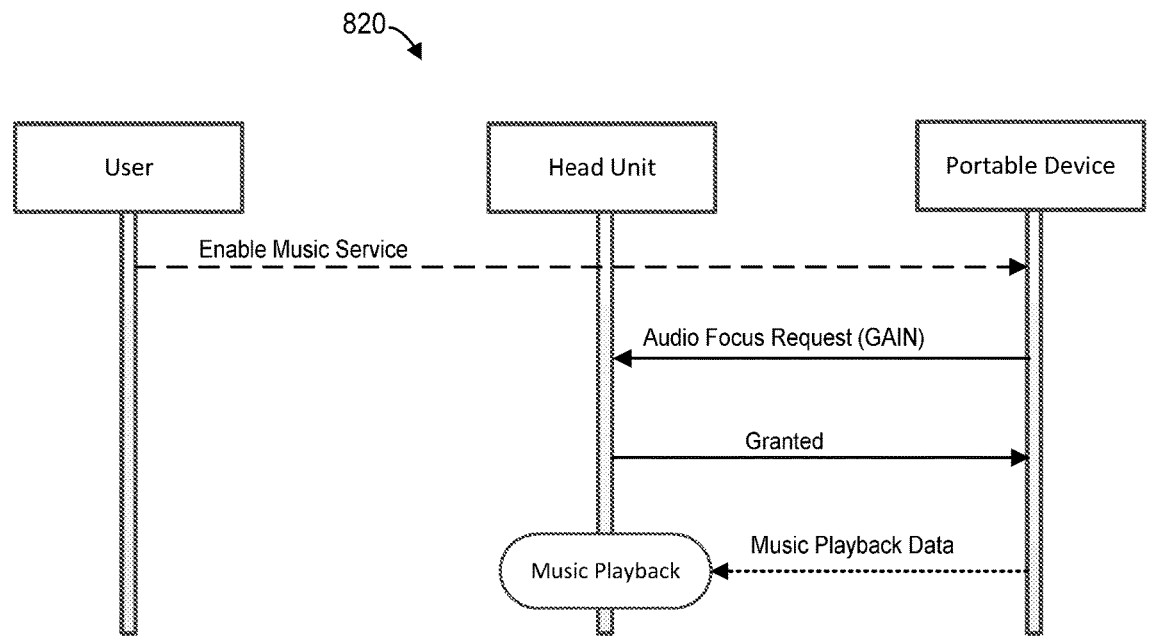
FIG. 9B is a message flow diagram of an example scenario in which the portable device requests and receives audio focus for streaming music from the head unit, in response to a user command.
Figure 9C:
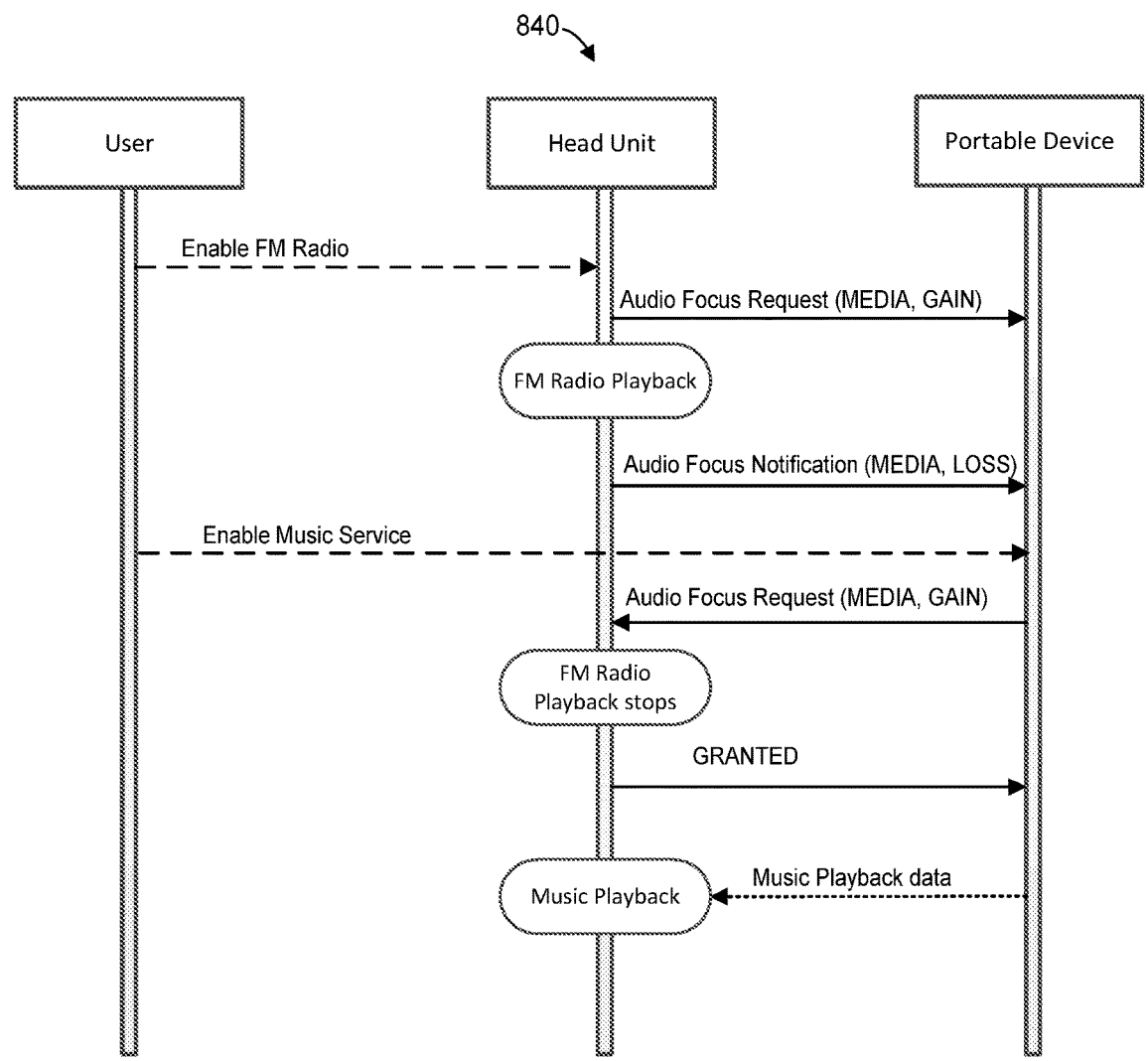
FIG. 9C is a message flow diagram of an example scenario in which the head unit acquires audio focus in response to a user command, and then cedes audio focus to the portable device for streaming music, in response to another user command.
Figure 9D:
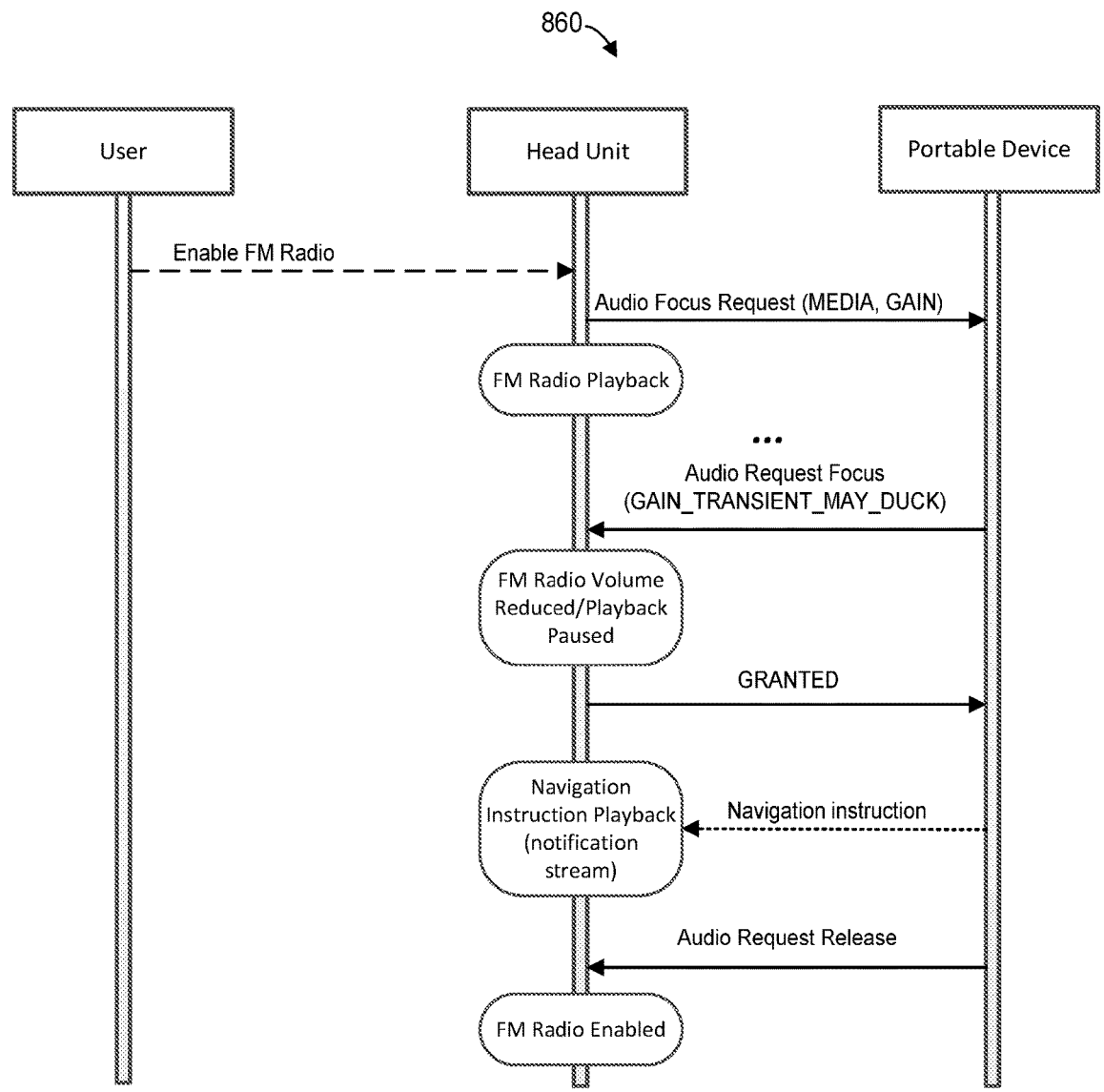
FIG. 9D is a message flow diagram of an example scenario in which the portable device provides an audio navigation instruction to the head unit during radio playback at the head unit.
Figure 9E:
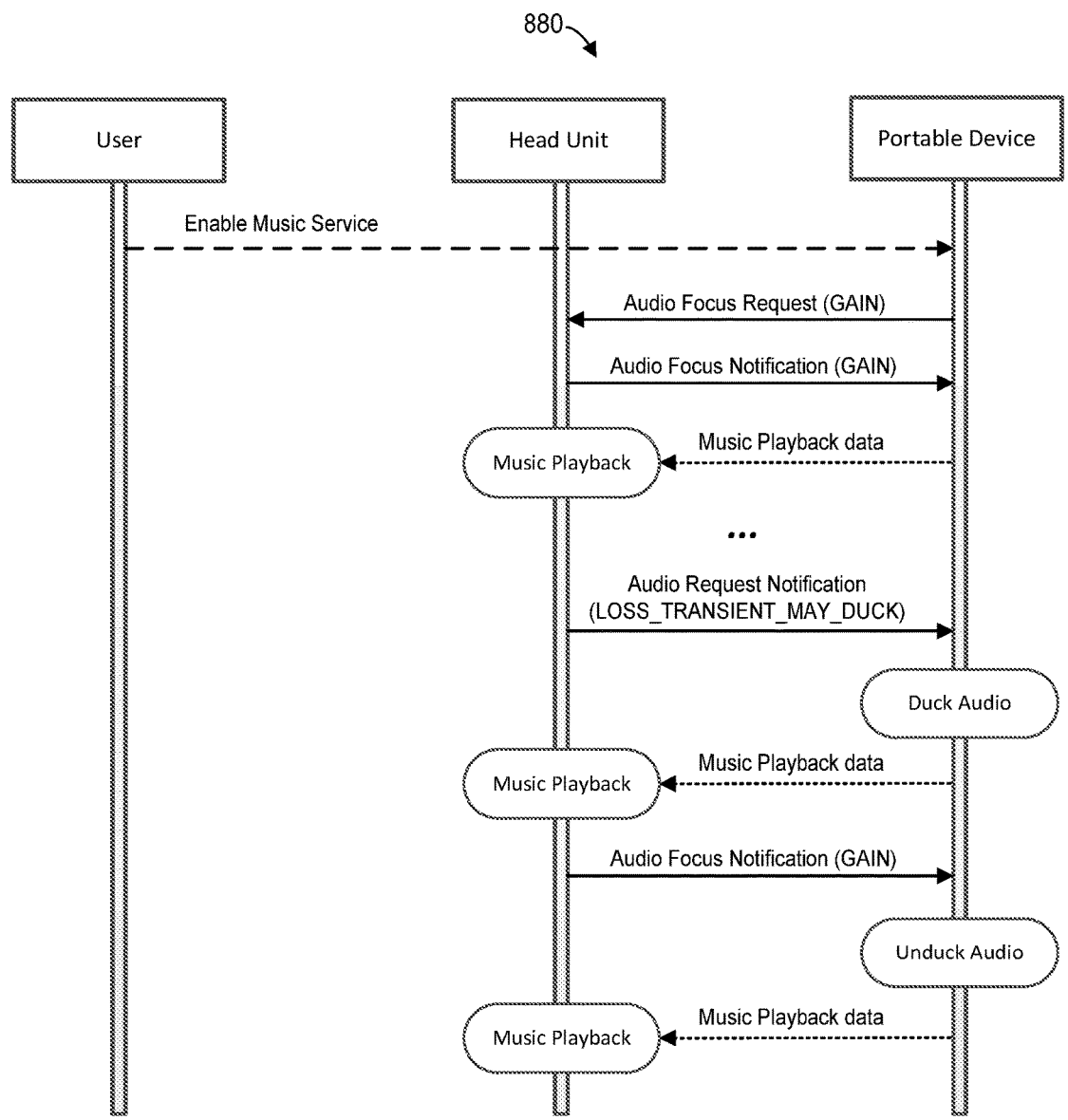
FIG. 9E is a message flow diagram of an example scenario in which the head unit generates an audio announcement while the portable device is streaming music to the head unit.
Figure 9F:
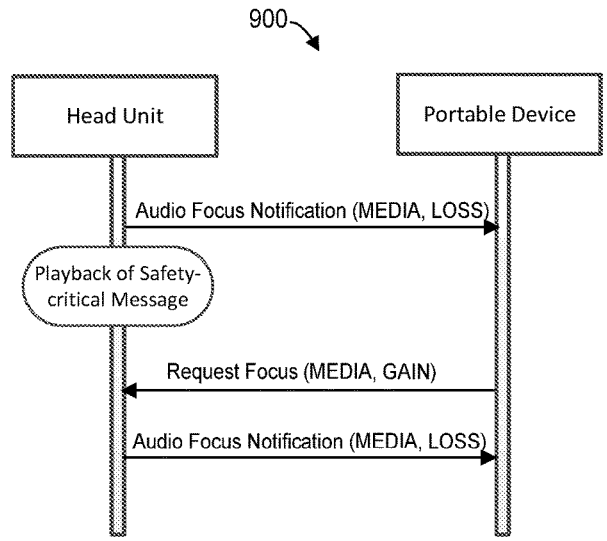
FIG. 9F is a message flow diagram of an example scenario in which the head unit denies a request from the portable device for audio focus, for safety reasons.
Figure 9G:
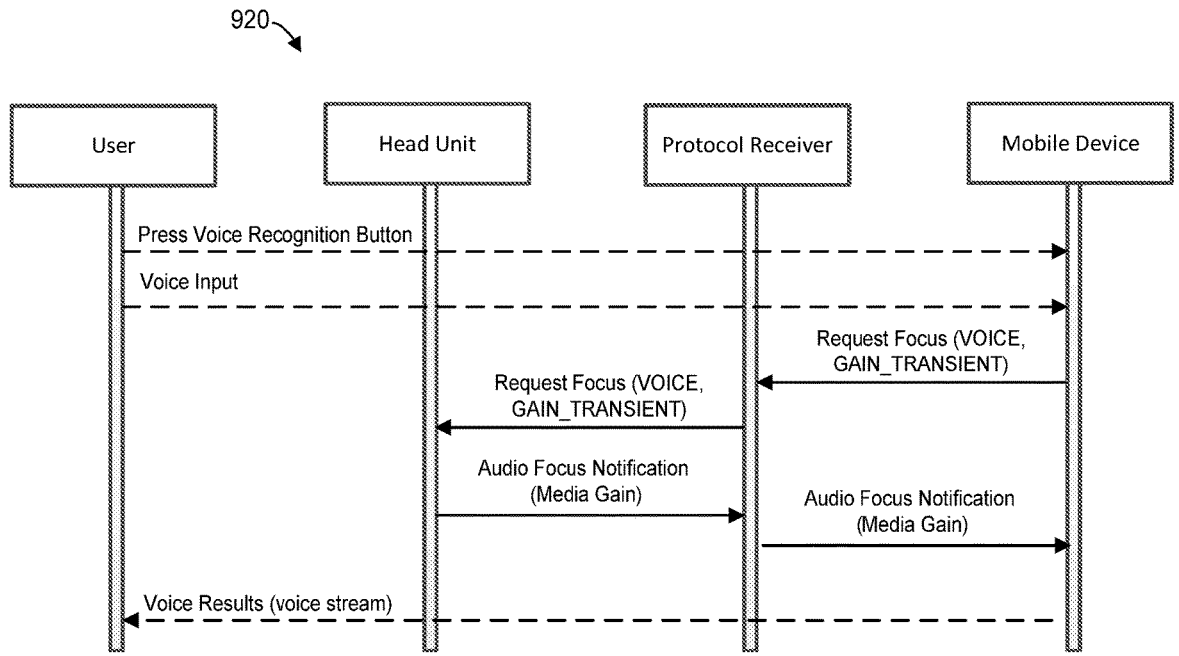
FIG. 9G is a message flow diagram of an example scenario in which the portable device applies voice recognition to audio received via the head unit.

FIG. 9A illustrates an example scenario 800 in which the head unit acquires audio focus in response to a user command. FIG. 9B illustrates an example scenario 820 in which the portable device requests and receives audio focus for streaming music from the head unit, in response to a user command. FIG. 9C illustrates an example scenario 840 in which the head unit acquires audio focus in response to a user command, and then cedes audio focus to the portable device for streaming music, in response to another user command. FIG. 9D illustrates an example scenario 860 in which the portable device provides an audio navigation instruction to the head unit during radio playback at the head unit. FIG. 9E illustrates an example scenario 880 in which the head unit generates an audio announcement while the portable device is streaming music to the head unit. FIG. 9F illustrates an example scenario 900 in which the head unit denies a request from the portable device for audio focus, for safety reasons. FIG. 9G illustrates an example scenario 920 in which the portable device applies voice recognition to audio received via the head unit.

VI. Detecting and Correcting Sensor Errors in the Automotive Environment

In the system 10 of FIG. 1, interconnected devices and/or subsystems such as the portable device 12 and the vehicle subsystem 14 in some situations generate poor sensor data. For example, the vehicle subsystem 14 can provide faulty accuracy information (such as setting the accuracy field to 0). As another example, the portable device 12 can generate poor compass data due to the presence of a magnetic object nearby. As yet another example, the vehicle subsystem 14 can output a wheelspeed that is 5% inaccurate due to tire pressure.

The automotive link layer 60 can use heuristic techniques to detect, and sometimes correct, sensor errors using combinations of sensor outputs from portable device 12 and the vehicle subsystem 14. In isolation, it may be difficult for portable device 12 as well as for the vehicle subsystem 14 to detect sensor errors. The automotive link layer 60 supports messages using which the portable device 12 and the vehicle subsystem 14 can collectively determine sensors errors.

In some implementations, the automotive link layer 60 collects raw sensor data readings from portable device 12 and/or the vehicle subsystem 14 and provides these raw sensor readings to the portable device 12. The portable device 12 then post-processes sensor readings from local and external (vehicle) sensors, in a navigation fix-up stage. In an example implementation, the geographic mapping application 126A (see FIG. 2) implements the navigation fix-up stage. In another implementation, the functionality is implemented in the head unit 18. For convenience, this functionality can be discussed with continued reference to the automotive link layer 60, which can include components, such as one or more software modules, on the portable device 12 and/or the head unit 18.

In an example scenario, the automotive link layer 60 detects a 5% drift in wheelspeed by comparing sensor readings forwarded from vehicle sensors by the head unit 18 to the GPS readings of the portable device 12 or, in some cases, combined GPS readings from the vehicle sensors and the portable device 12. The automotive link layer 60 then sets up a feedback loop to correct this drift, so as to make the wheelspeed more accurate.

In another example, the portable device 12 receives inaccurate GPS data from the vehicle subsystem 14 and uses GPS accuracy on the portable device 12 as a proxy for GPS accuracy on the car. As yet another example, the portable device 12 can determine that its bearing can be ignored if GPS bearing from the vehicle subsystem 14 provides different values. In this case, the portable device 12 can determine that the user is probably moving the portable device 12 within the vehicle.

Figure 10:
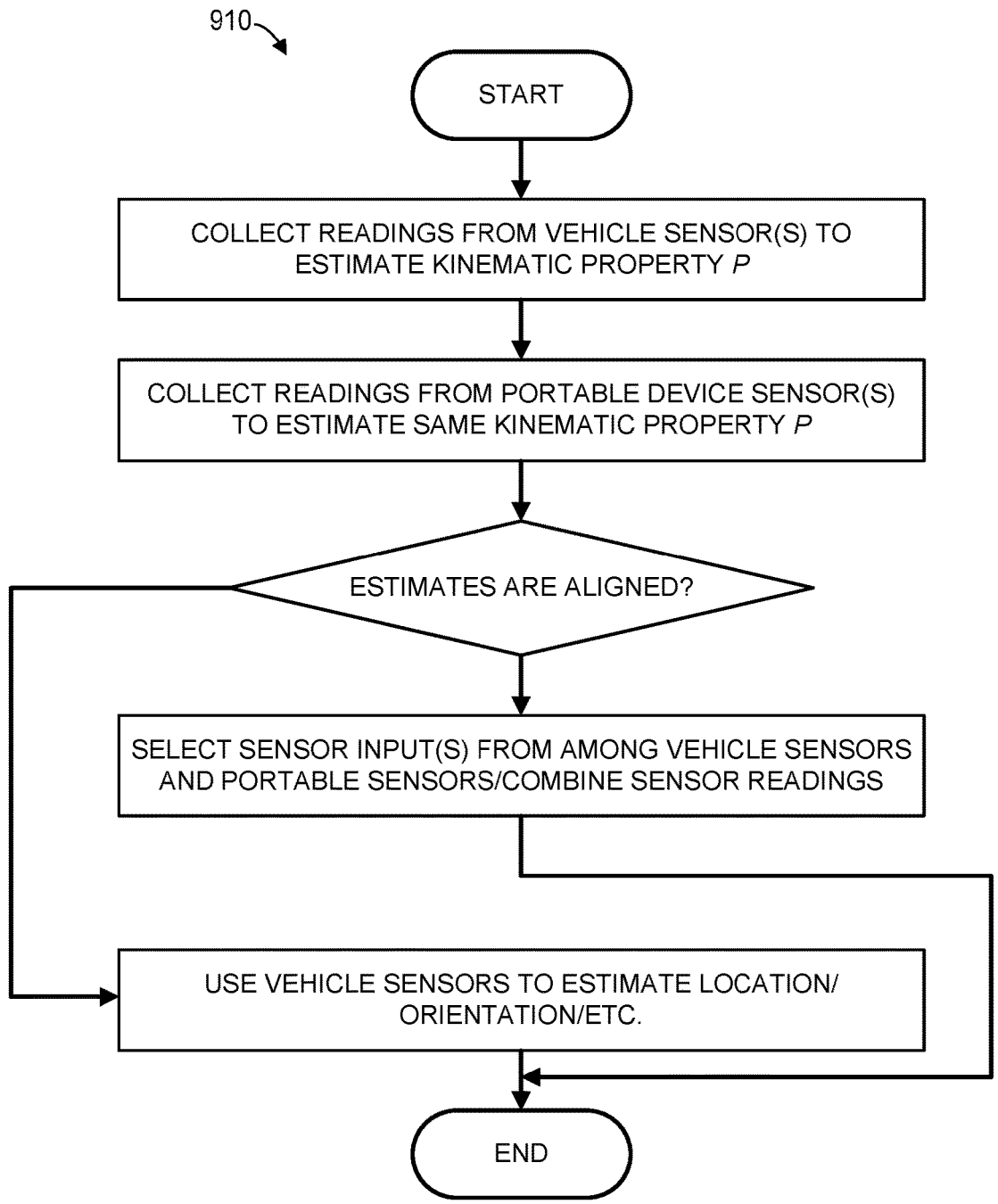
FIG. 10 is a flow diagram of an example method for determining appropriate conditions for combining sensor output from a portable device with sensor output from a head unit.

More specifically, the automotive link layer 60 checks whether the compass bearing on the portable device 12 changes substantially in sync with the compass bearing on the vehicle that includes the vehicle subsystem 14, over a certain period of time. If the compass changes at the same time, the automotive link layer 60 an estimate that the portable device is stationary within the car. This determination can help the system to combine sensor readings. Otherwise, if the bearing does not change at the same time, the user may be moving the portable within the car, and sensor fusion is likely to yield unreliable results. An example method 910 for determining conditions for combining sensor output from the portable device 12 with sensor output from the head unit 18 is illustrated in FIG. 10.

As another example, if the accelerometer of the portable device 12 indicates that the portable device 12 is moving, but sensor readings from the vehicle indicate reports the vehicle is stationary, the portable is probably moving relative to the vehicle.

VII. Simulated Routes

When having access to the map data 42 via the network server 40 (or, in some cases, when storing large amount of offline map data), the portable device 12 can access a rich road graph (which can include a data structure indicating connections between road segments, lengths of road segments, various restrictions related to road segments, speed limits, lane restrictions, etc.). Using this road graph, the portable device 12 can generate a simulated route, which can include a sequence of maneuvers such as turns and lane changes, for example, at corresponding geographic locations.

To determine whether the vehicle responds to the route as expected, the portable device 12 can provide the simulated route to the head unit 18, which in turn can provide the parameters of the simulated route to vehicle components such as sensors. Referring to an example scenario 920 illustrated in FIG. 11, the software stack of a portable device 922 can generate a simulated route and cause, via a head unit 924, various vehicle components 926 to respond to the generated route. The portable device 922 can correspond to the portable device 12 and/or 100, and the head unit 922 can correspond to the head unit 18 and/or 200. The head unit 18 in some cases accesses components and software modules spread across various components of the vehicle and/or the portable device 12.

As one example, a certain vehicle can be configured to automatically turn on the headlights based on a sun calculation combined with the current position of the vehicle. The portable device 12 in this case makes a simulated position available to the vehicle, so that the response of the vehicle can be tested.

Figure 11:
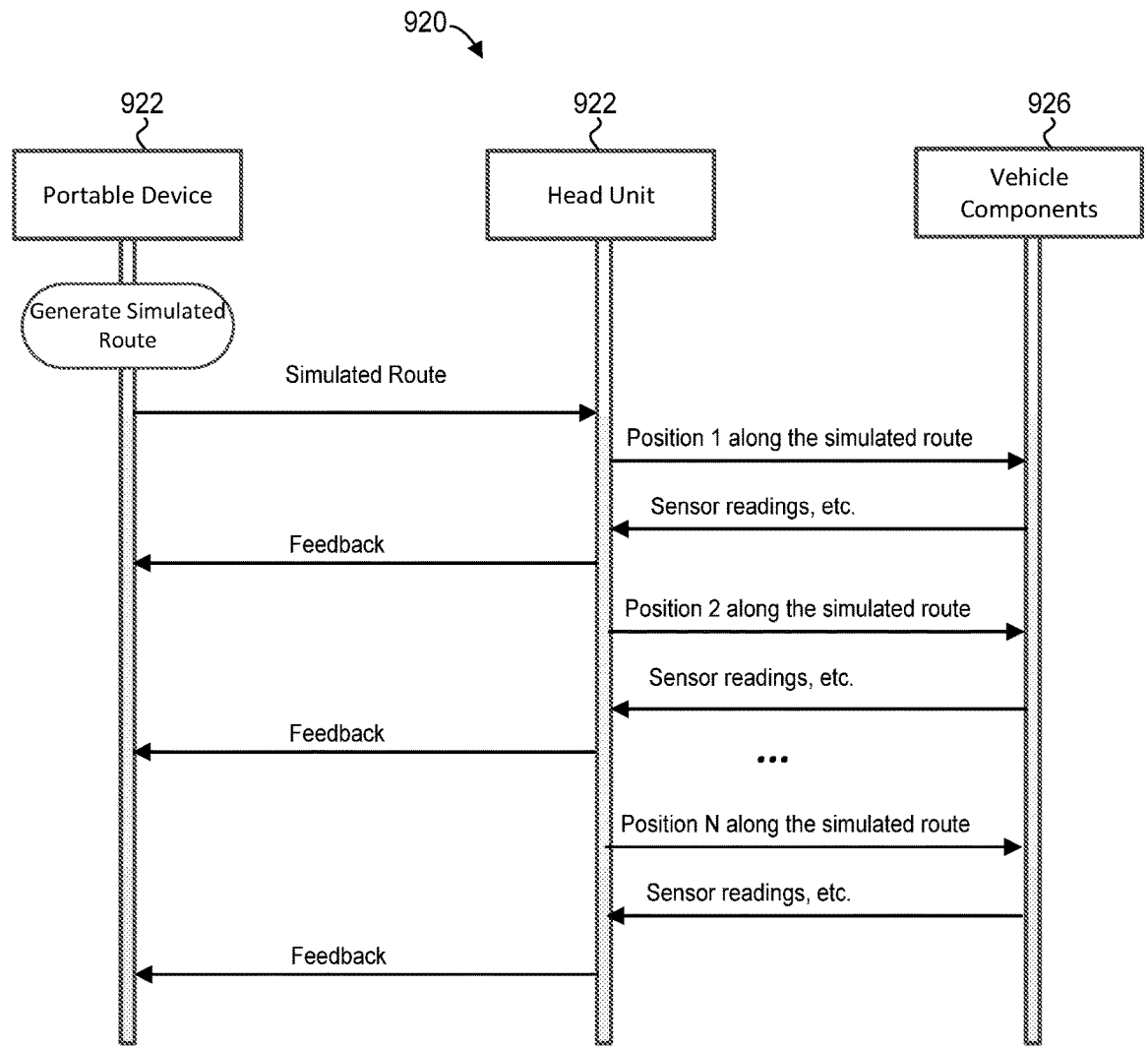
FIG. 11 is a message flow diagram of an example scenario in which a portable device provides a simulated route to a head unit of vehicle and receives feedback based on the output of a vehicle components.

With continued reference to FIG. 11, the portable device 922 can provide a simulated route as a sequence of multiple maneuvers and locations or, in another implementation, the portable device 922 can provide indications of locations (and maneuvers) individually. Further, the head unit 922 can provide feedback, such as sensor readings, status indicators for various vehicle components 926, etc. individually, as illustrated in FIG. 11, or as a single collection of data.

VIII. Preventing the User from Activating Phone Features

Figure 12:
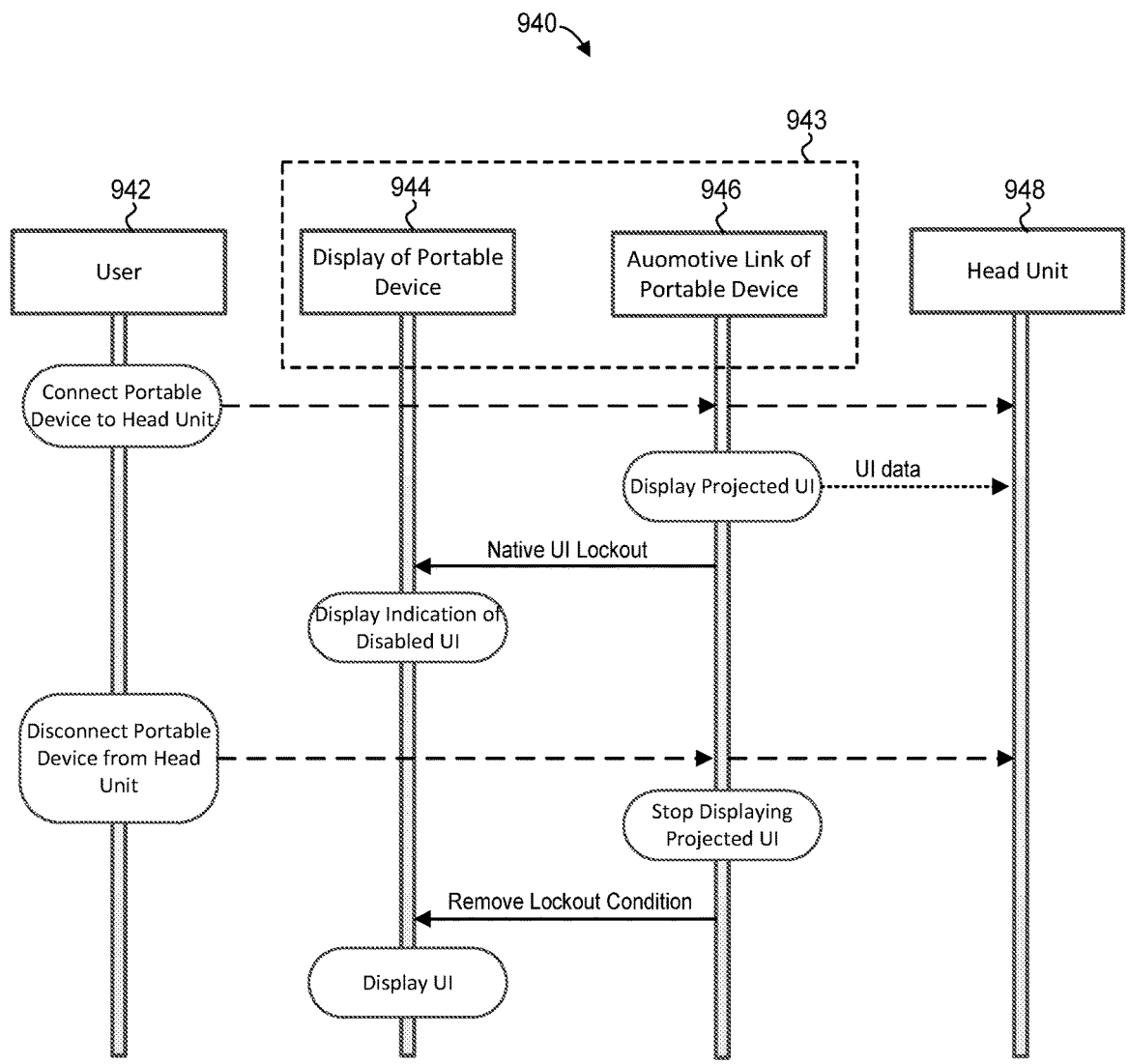
FIG. 12 is a message flow diagram of an example scenario in which a portable device locks out its user interface when projecting user interface to a head unit of a vehicle.

In an example scenario 940 illustrated in FIG. 12, a user 942 connects a portable device 943 to a head unit 948, and an automotive link 946 of the portable device 943 begins to transmit projected UI to the head unit 948. The automotive link 946 can correspond to the automotive link layer 60 discussed above, for example. The automotive link 946 also locks out native UI of the portable device 943. In other words, the automotive link 946 prevents the user from accessing the display 944 of the portable device 943 without disconnecting the portable device 943 from the head unit 948. The display 944 can be blank during the lock-out stage or can display an indicator, such as a text message "disconnect the device to access menu."

Thus, if the driver wishes to access a banking application on the portable device 943 while the portable device 943 is connected to the head unit 948, he or she is effectively prevented from doing so. In this manner, the automotive link 946 can reduce distractions. After the user 942 disconnects the portable device 943 from the head unit 948, he or she again can access the user interface of the portable device 943 via the display 944.

It is noted that while the display 944 is locked out, the portable device 943 can continue to project UI via the head unit 948. The projected UI can provide the user 942 with access to some of the features of the portable device 943, such as the automotive applications 126 of FIG. 2, for example.

IX. Locking Out Features in View of Vehicle Data

Further, in some implementations, the head unit 18 can provide environmental data to the portable device 12, and the portable device 12 can determine which UI features should be enabled, disabled, or altered in response to these environmental conditions. The UI features which the portable device 12 can thus modify can be native to the head unit 18 or to the portable device 12. In one example implementation, the portable device 12 implements the policy according to which UI features are locked out, reactivated, or altered, and sends appropriate commands to the head unit 18.

Figure 13:
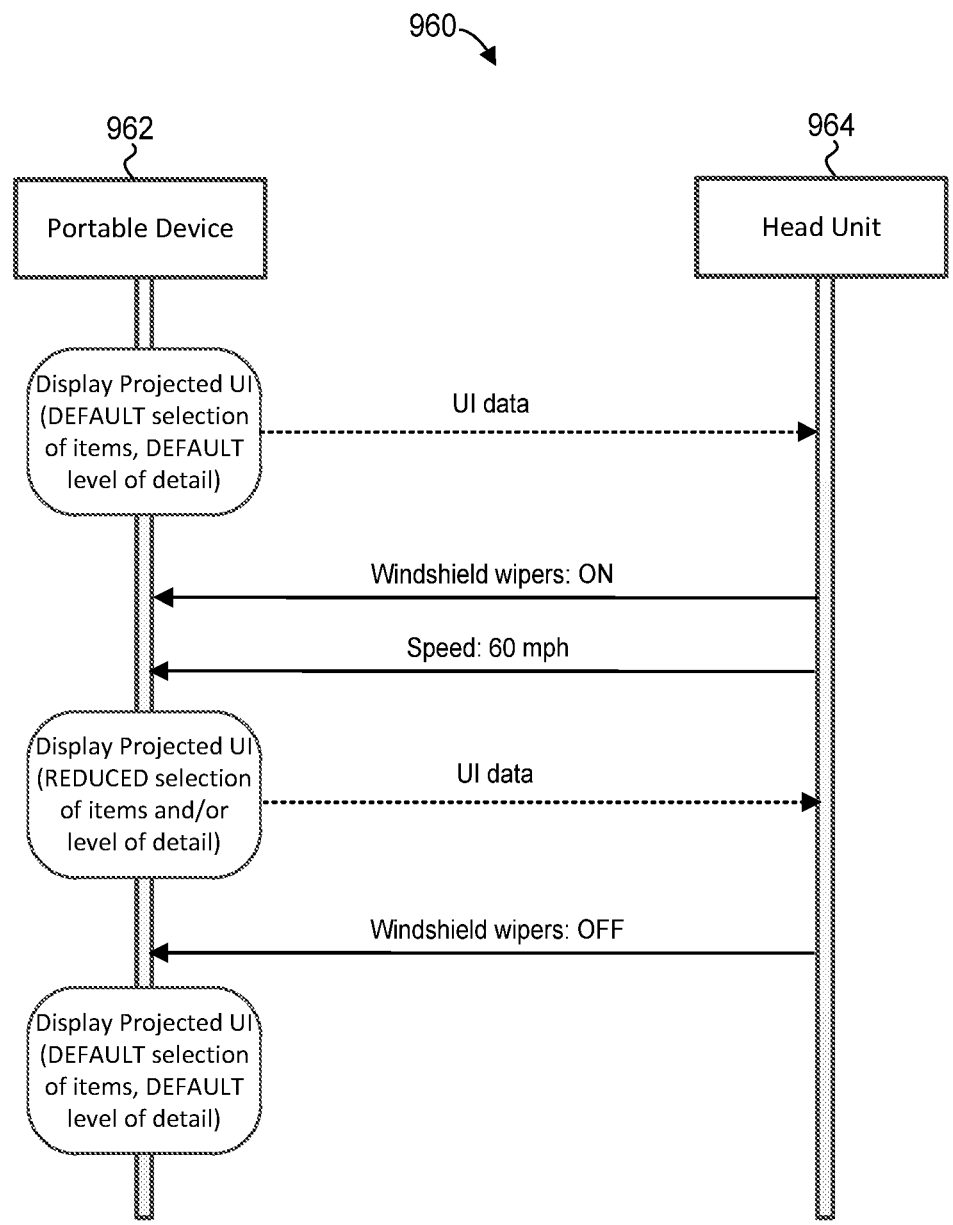
FIG. 13 is a message flow diagram of an example scenario in which a portable device adjusts presentation and/or selection of content projected via the head unit of a vehicle in response to environmental factors reported by the head unit.

FIG. 13 illustrates an example scenario 960 in which a portable device 962 (which can correspond to the portable device 12 and/or 100) is coupled to a head unit 964 (which can correspond to the head unit 18 and/or 200). The portable device 962 initially provides projected UI at a default level of detail. The head unit 964 then reports changes in environmental data, such as an indication that windshield wipers are now on, to the portable device 962. The head unit 964 also reports that the vehicle is moving at 60 miles per hour.

The portable device 962 can consider these signals and determine that the geographic search results, generated by a geographic application such as the application 126A, and being provided via projected UI, should be reduced to one page. The driver then can see these search results without scrolling or paging through the list. Thus, the portable device 962 in this scenario effectively locks out the scrolling/list paging feature.

As another example, the vehicle 964 can display a keyboard as part of its native UI. The portable device 962 can determine that, if the head unit 964 reports that the vehicle has no passenger (e.g., based on the weight sensed by the passenger seat), the keyboard should be disabled whenever the vehicle is moving. To this end, the portable device 962 can send an appropriate command to the head unit 96.

X. Styling of Map Data in Accordance with Vehicle Data

When displaying geographic or navigational information to a driver of a vehicle, it is often desirable to ensure that the driver can easily view, read and understand the information at a glance. When the portable device 12 is connected to the vehicle subsystem 14 (see FIG. 1), the portable device 12 can adapt the display of map data, geographic search results, and other geographic data for display within the vehicle environment. More specifically, the portable device 12 can change the visual presentation of a digital map in view of the connection between the portable device 12, where the digital map is rendered, and the head unit 18, where the digital map is presented.

In some implementations, portable device 12 adjusts the digital map being rendered for presentation in the vehicle by applying certain "styles," or sets of visual attributes such as color, transparency, line thickness, etc. to map feature geometry. The portable device 12 can select a style based on the general automotive context, which can be the same in vehicles of all types, and/or vehicle-specific automotive context. A vehicle-specific automotive context can depend on car make, model, year, as well as more specific parameters as interior color.

Figure 14:
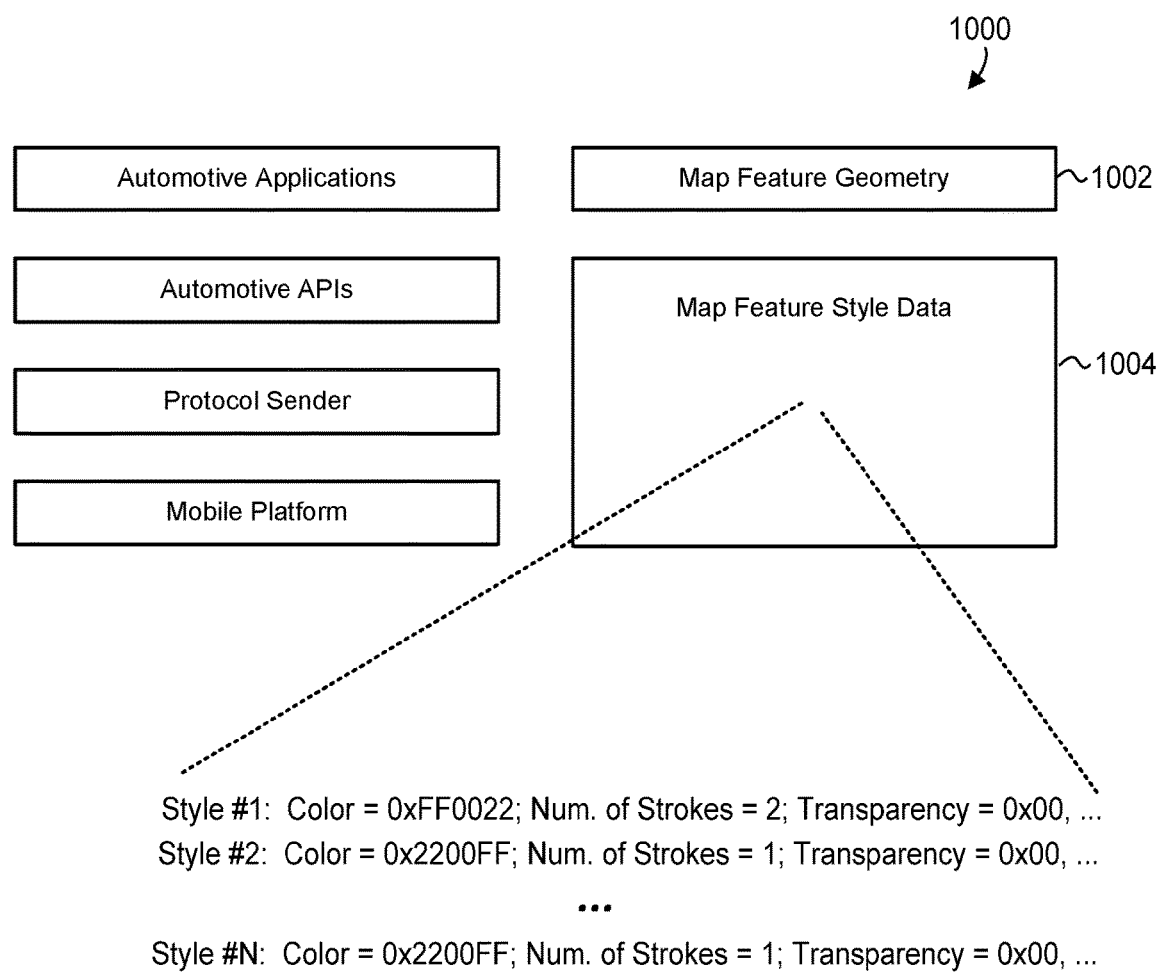
FIG. 14 is a block diagram of an example memory module of the portable device of FIG. 1, in which map styling data describes different visual styles for automotive and non-automotive environments.

FIG. 14 is a block diagram of an example memory 1000, which can correspond to the memory 116 of the portable device 100, for example. In the memory 1000, map styling data is used to describe different visual styles for automotive and non-automotive environments. Similar to the memory 116 illustrated in FIG. 2, the memory 1000 can store various software components or modules such as a mobile platform, a protocol sender, automotive APIs, and automotive applications.

The memory 1000 also includes a map feature geometry module 1002, which stores map data, and a map feature style data module 1004, which stores map style data. The map data includes descriptions of geometry for various map features such as buildings, parks, and bodies of water, text labels, textures, various forms of metadata, etc. Some of these map features can be defined in a vector graphics format or another suitable scaleable format. In some cases, the map data can also include raster images in a bitmap format, for example. The map style data includes various style parameters for rendering the map data. For example, each style parameter may describe a respective color, number of strokes, width for each of the strokes, transparency level, etc.

With reference to FIG. 1, during operation, the portable user device 12 may request map data and map style data for rendering a digital map of a geographic region from the network server 40. The map database 42 can provide the map data along with the map style data. The portable user device 12 can store the received map data in the module 1002 and the received map style data in the module 1004. The portable user device 12 then can display the digital map of the geographic region and the render the digital map with appropriate style parameters.

When the portable user device 12 is connected to the vehicle (such as the head unit 18) the digital map displayed in device 12 can be rendered in a manner that is suited to the vehicle environment. The portable user device 12 can render the digital map by applying different styles or sets of visual attributes to generate different visualizations of the same geographic area. For example, the portable user device 12 can effectively hide certain geographic features that are typically less relevant in an automotive context to provide enhanced user experience. The portable device 12 can also automatically switch between different styles when the user connects to the portable device 12 to the vehicle or, conversely, when the user unplugs the portable device 12 from the vehicle.

In an example scenario, the user may view a map on the portable device 12 with certain map features present such as bus stop icons. When the user connects the portable device 12 to the vehicle, the bus stop icons may be less relevant to the user who is now driving the vehicle. As such, the portable device 12 may apply appropriate styles, such as changing the transparency level of the bus stop icons, in order to remove the bus stop icons from the map view. This helps to enhance user experience by simplifying the map and removing potential clutter.

In another example scenario, when the user connects the portable device 12 to the vehicle, the portable device 12 may apply styles to highlight certain map features. For example, thicker lines may be applied to roads to make the road appear more visible. As another example, some driving-related map elements such as street signs or gas stations may be bolded to emphasize the importance or relevance of these element to the user driving the vehicle.

In yet another example scenario, the portable device 12 may render the map in a different way when the vehicle is in motion. In other words, relevant map features may be visualized according to the speed of the vehicle. For example, as the vehicle speeds up, some less important map elements, such trees, buildings, parks, etc., may be given less detail or removed all together, while other more important map elements, such as landmarks, may be given greater detail or highlighted. Thus, the driver can better see and understand the environment surrounding the vehicle while the vehicle is in motion.

XI. Use of User-Intent Signals for Task Continuity

When a user explicitly or implicitly selects a certain geographic location via her portable device and later connects the portable device to the head unit of a car, the portable device can automatically trigger display of driving directions or other information related to the geographic location via the head unit. In particular, the portable device can request control of the display device embedded in the head unit and, depending on the implementation and/or configuration of the head unit, the portable device can acquire the control automatically or upon the user confirming via the head unit.

A software module executing on the portable device can determine a context related to the geographic location based on the currently active application (e.g., a mapping application displaying the geographic location on a digital map, a web browser displaying a listing for a business at the geographic location, a messaging application in which a message being perused includes a street address) and/or past user activities (e.g., web searches, geographic queries, requests for navigation directions). In some implementations, the software module executing on the portable device queries a network server to determine whether navigation data, a business data, or other information should be projected onto the display device of the head unit. The determination in some cases can be based on a calculation of the likelihood the user will request navigation directions, business data, a digital map, etc.

Thus, a user can simply connect the portable device to the head unit and, without explicitly selecting input from the portable device via the head unit and navigating menus to select the desired function, see automatically selected geographic data on the head unit. In this sense, software executing on the portable device can provide continuity of user experience when a portable device connects to a head unit.

In an example scenario, user Alice launches a navigation application on her smartphone and submit a query for the nearest movie theater. She then plugs in the smartphone into the head unit of her car. The head unit displays a dialogue prompting Alice to confirm that she wishes to request navigation directions to the movie theater. Upon Alice's confirmation, the smartphone begins to project navigation directions via the head unit. It is noted that Alice in this example scenario did not have to explicitly activate the mode on the head unit to receive and project data from the smartphone, nor did Alice have to navigate menus and activate this mode explicitly on her smartphone. Moreover, Alice did not have to launch or re-active a mapping/navigation application, again select the movie theater, and submit a command for projecting navigation directions to the movie theater via the head unit.

Figure 15A:
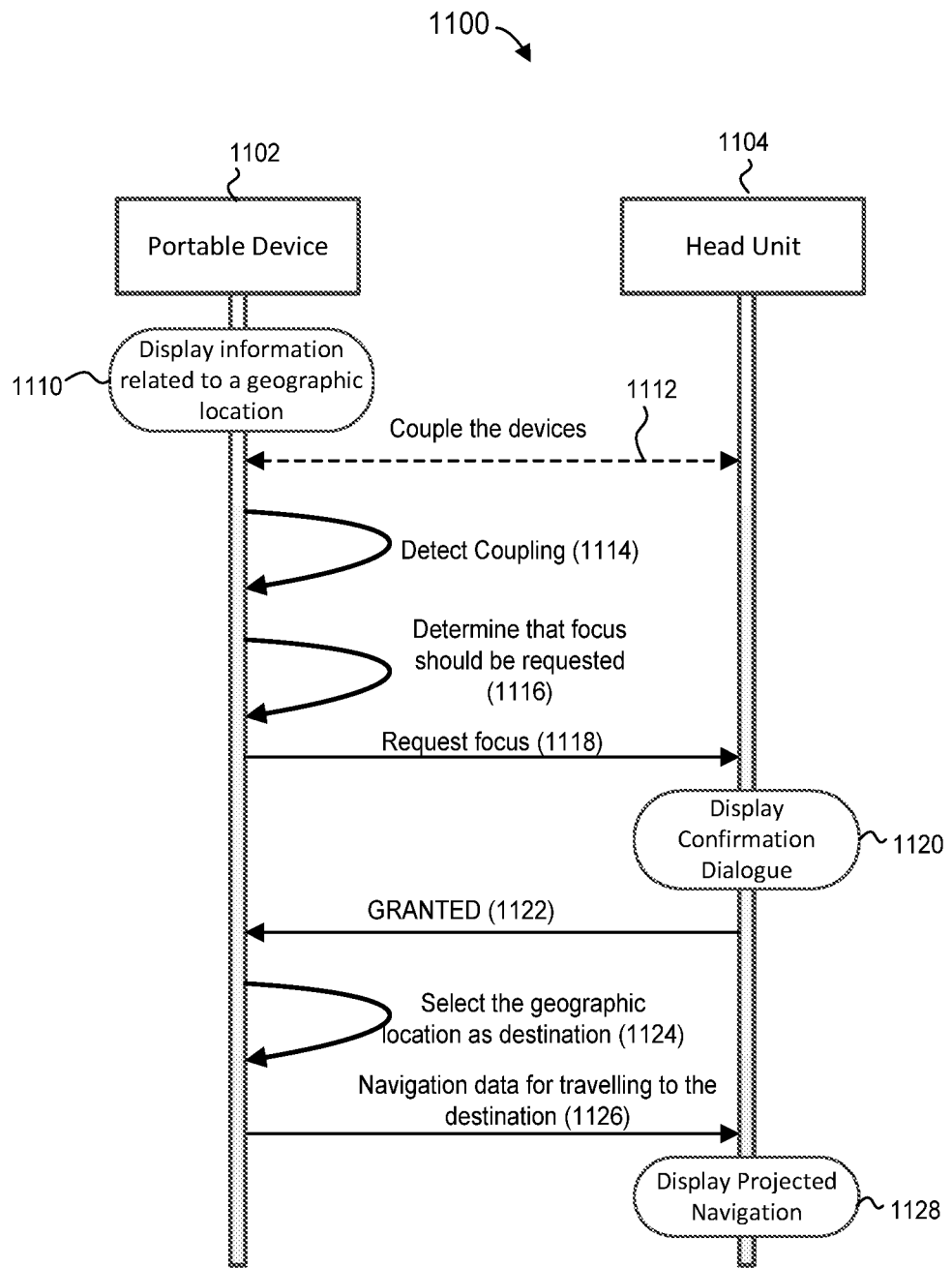
FIG. 15A is a message flow diagram of an example scenario in which the portable device detects communicative coupling to a head unit of a vehicle, determines a geographic context related to a geographic location, and automatically requests focus for projecting navigation directions to the geographic location.

For further clarity, FIG. 15A illustrates example messaging sequence 1100 between a portable device 1102 and a head unit 1104. The head unit 1104 can correspond to the head unit 200 of FIG. 3 and/or the head unit 18 of FIG. 1, and the portable device 1102 can correspond to the portable device 100 of FIG. 2 and/or the portable device 12 of FIG. 1, for example.

According to the scenario of FIG. 15A, the user selects a certain geographic location via an interactive mapping application (e.g., the mapping application 126A of FIG. 2) or by viewing information regarding the geographic in a web browser, for example (event 1110). As a more specific example, the user can view the hours of operation for a certain geo-located business in a browser window on the portable device 1102. When the user couples the portable device 1102 to the head unit 1104 (event 1112), the browser window is active and foregrounded. A software component executing on the portable device 1102, such as the protocol sender 122 or the geographic/mapping application 126A (see FIG. 2), can detect the coupling (event 1114) by monitoring operating system events, for example. The software component then can automatically determine that focus should be requested from the head unit 1104 (event 1116) and request focus by sending one or more messages (event 1118). In some implementations, the software component does not prompt the user at all prior to requesting the focus, or relies on an authorization previously provided by the user. The geographic/mapping application 126A in this scenario may execute in the background and await events related to coupling of the portable device 1002 to a head unit of a vehicle.

The head unit 1104 can display a confirmation dialogue (1120) and, upon receiving confirmation, provide an appropriate indication to the portable device 1102 (event 1122). In response, the protocol sender 122, the geographic/mapping application 126A, or another software component can automatically select the geographic location, previously selected at state 1110, for use with the head unit 1104 (event 1124). For example, a mapping application executing on the portable device 1102 can generate and project navigation data for driving to the geographic location (events 1126, 1128). As another example, a software component executing on the portable device 1102 can project the hours of operation or other information related to a business entity at the geographic location.

Thus, rather than explicitly selecting information or a task to be projected via a head unit, the user can simply confirm that an automatically selected geographic location and the corresponding task (e.g., navigation, viewing hours of operation, dialing the phone number) are correct. In other words, a software component executing on the portable device 1102 and/or a network server in some cases can effectively anticipate user needs based (at least in part) on the current user activity on the portable device.

Further, in addition to the current activity, the software component and/or the network server can anticipate user needs based past activities of the user and even activities of other users. To modify the example above, Alice can use a web browser on her smartphone to look up the show times at the nearest movie theater. In accordance with the settings Alice previously entered, her smartphone and/or a network server creates a data record that indicates an association between Alice, the web site related to the movie theater, and the time of her visit to the web site. An hour later, Alice can get into her car and connect the smartphone to the head unit. A software running on her smartphone and/or the network server generates an indication that Alice is likely to drive to the movie theater. Accordingly, the smartphone automatically requests focus and begins to project navigation directions.

Figure 15B:
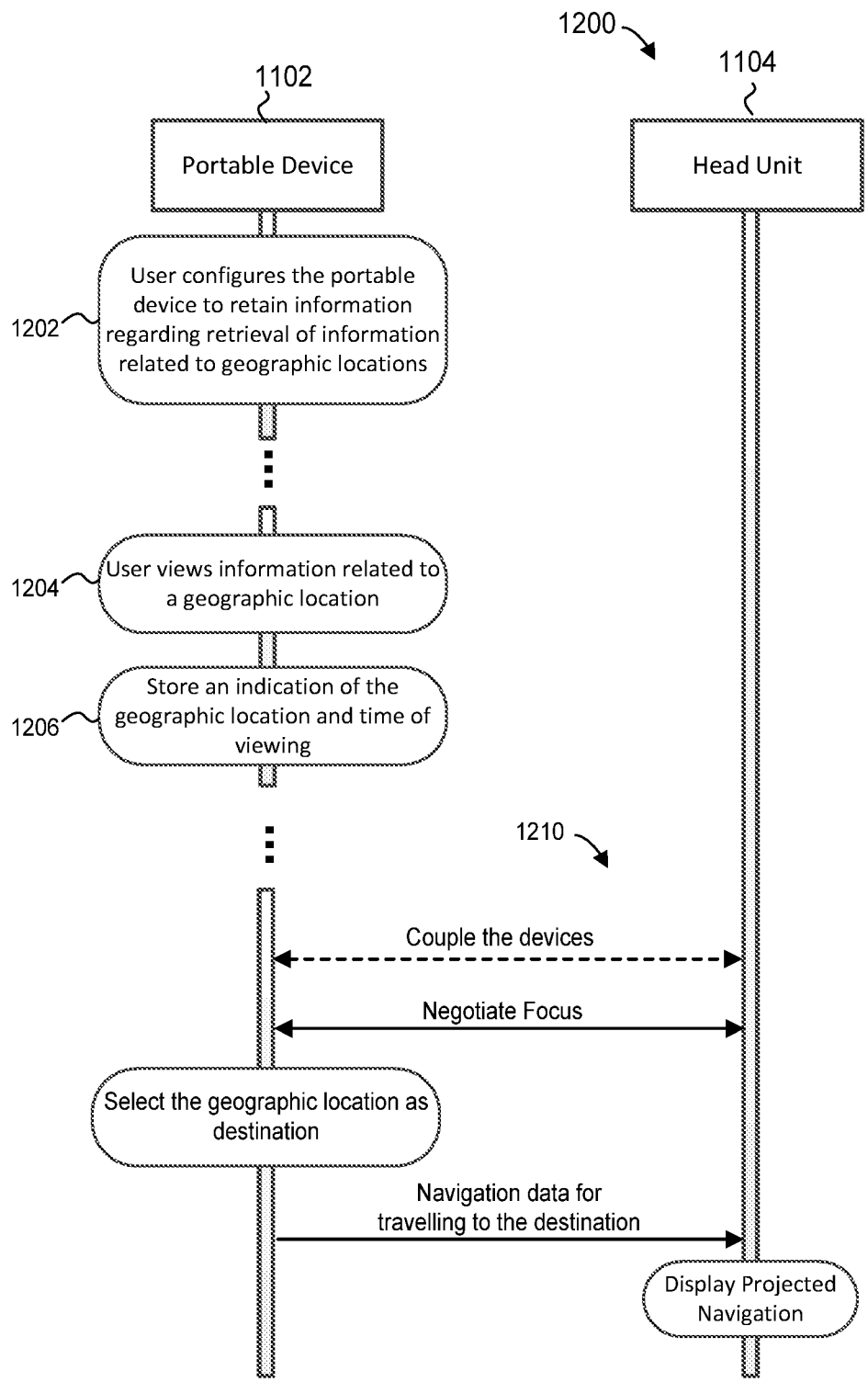
FIG. 15B is a message flow diagram of an example scenario in which the portable device or a network server selects a geographic location, for use in projected navigation directions, based on previous user activities.

FIG. 15B illustrates example messaging sequence 1200 between a portable device 1102 and a head unit 1104. Similar to the episode involving Alice and the website, the scenario of FIG. 15B includes activities on the portable device 1102 between selection of a geographic location and coupling to the head unit 1104. In particular, the user at some point can configure the portable device 1102 to retain a geographic context, such as the selection of a certain geographic location via a web browser, an email application, a messaging application, a geographic/mapping application, etc. (event 1202). At a later time, the user can view information related to a geographic location using a web browser application, or messaging/mailing application, a geographic/mapping application, etc. (event 1204).

The indication of the geographic location can be stored in the memory of the portable device 1102 or on a network server, depending on the implementation or scenario (event 1206). In at least some of the implementations, the time of viewing the information is stored along with the indication of the geographic location. The user may then background the application using which she viewed information related to the geographic location or even completely close this application.

At a later time, the user can couple the portable device 1102 to the head unit 1104, and the portable device 1102 can automatically determine a geographic context related to a geographic location, negotiate focus, and project information for the geographic location via the head unit, similar to the scenario of FIG. 15A (events 1210). In this case, however, the portable device 1102 can determine the geographic context based on the information stored when processing the event 1106. Thus, although the application with which the geographic context was established may no longer be active, the portable device 1102 can nevertheless automatically suggest projecting navigation directions via the head unit based on the user's past activities.

Figure 15C:
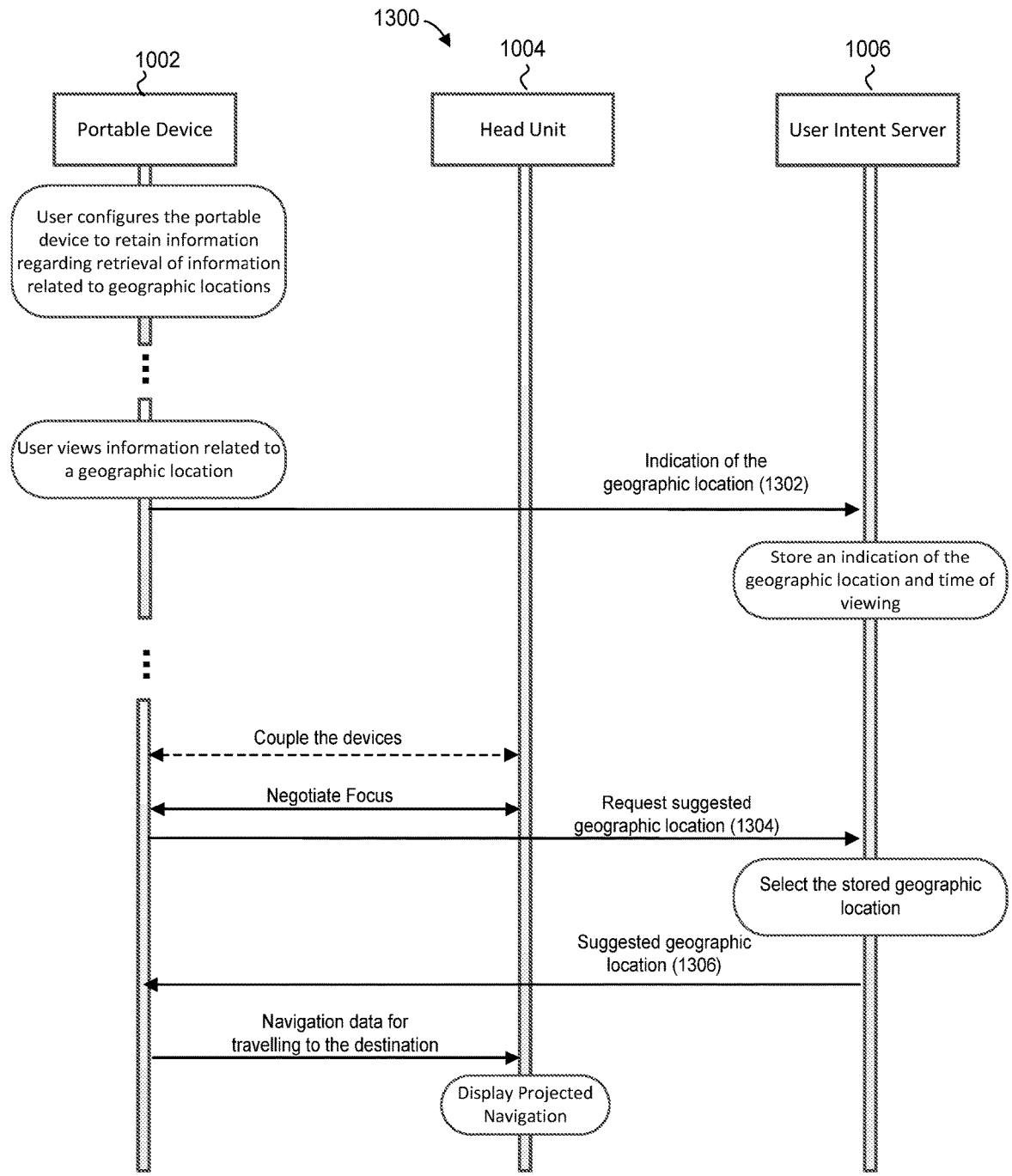
FIG. 15C is a message flow diagram of an example scenario in which a portable device receives a suggested geographic location from a network server, and uses the geographic location when projecting navigation directions via a head unit.

FIG. 15C illustrates messaging sequence 1300 which is generally similar to the sequences 1100 and 1200, except that a user intent server 1004 determines a suggested geographic location, for use in projecting data via a head unit, using an indication of a current and/or past user activity. The user intent server 1004 can operate as a component of the network server 40 of FIG. 1, for example, or as a separate server.

In the scenario of FIG. 15C, the portable device 1002 transmits an indication of a geographic location to the user intent server 1006 (event 1302), requests a suggested geographic location from the user intent server 1006 upon detecting coupling to the head unit 1004 (event 1304), and receives a suggested geographic location (event 1306). The request corresponding to the event 1304 can include an indication that the portable device 1002 is now coupled to the head unit 1004. The user intent server 1004 can select a suggested geographic location based a single event (e.g., the user currently viewing information about a geo-located business in a browser window), a single instance of a recent activity (e.g., the user submitting a query for a geographic location), or multiple instances (e.g., the user frequently driving to a certain geographic location). Further, the user intent server 1004 can estimate relevance of certain geographic locations in view of time. For example, the user can drive to a certain location at a certain time of day. As discussed above, the user can configure the portable device 1102 and/or the user intent server 1006 to use this user-specific data in generating suggestions by explicitly operating certain controls or by installing certain applications or plugins, for example.

Figure 15D:
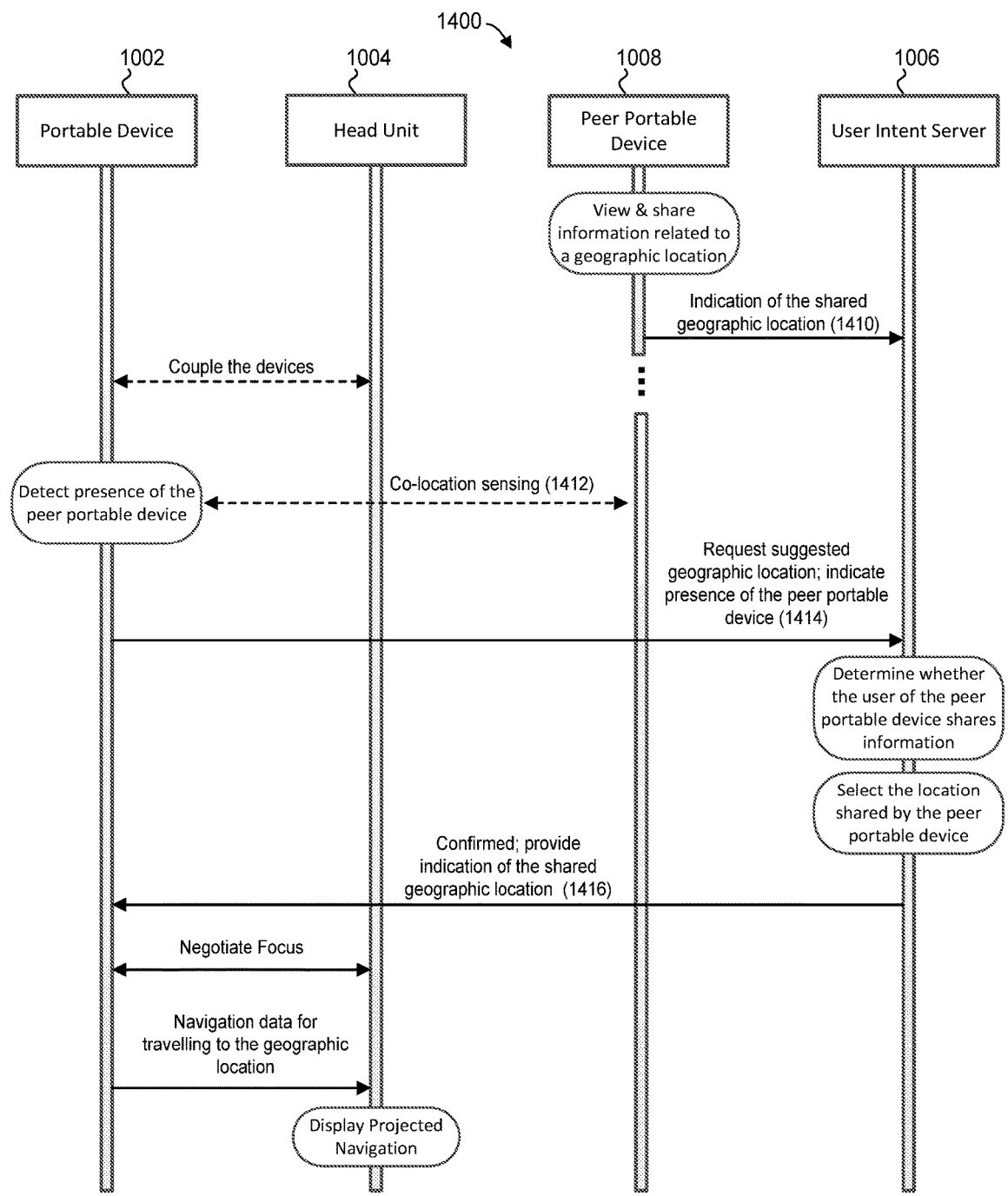
FIG. 15D is message flow diagram of an example scenario in which a portable device or a network server selects a geographic location for use in projecting navigation directions from a portable device based on activity of another portable device.

Now referring to FIG. 15D, an example messaging sequence 1400 corresponds to a scenario in which the user intent server 1006 determines a geographic location, related to information projected from the portable device 1002 via the head unit 1004, based on relevant activity at a peer portable device 1008.

Referring again to Alice, her friend Bob in an example scenario launches an application for making restaurant reservations and looks up the hours when a certain café is open. Bob has previously chose to share certain information with Alice. When Alice and Bob get into a car, Alice's smartphone determines that Bob is in the car as well, using any suitable proximity sensing or location sharing technique (provided Alice and Bob have configured their respective smartphones for this purpose). Alice's smartphone queries a network server that selects a suggested geographic location for projecting navigation direction based on not only Alice's profile but also on the information Bob shared with Alice. In this scenario, Alice's smartphone can then automatically request navigation directions or business information for the café and project the information via the head unit.

As illustrated in FIG. 15D, the peer portable device 1008 shares an indication of a geographic location with the user intent server 1006 (event 1410). At a later time, the portable device 1002, coupled to the head unit 1004, detects the presence of the peer potable device 1008 (events 1412) and requests that the user intent server 1006 provide a suggested geographic location in view of the detected presence of the peer portable device 1008 (event 1414). The user intent server 1006 then selects the geographic location received as part of the event 1410 and provides this location to the portable device 1002 (event 1416), for projecting the corresponding navigation directs or other relevant information via the head unit 1004.

More generally, the user intent server 1006 can select geographic locations based on one or more of such signals as phone calls, visited web pages, search results, current state of the application, etc., for one or more users, provided these users chose to share this information.

Figure 16:
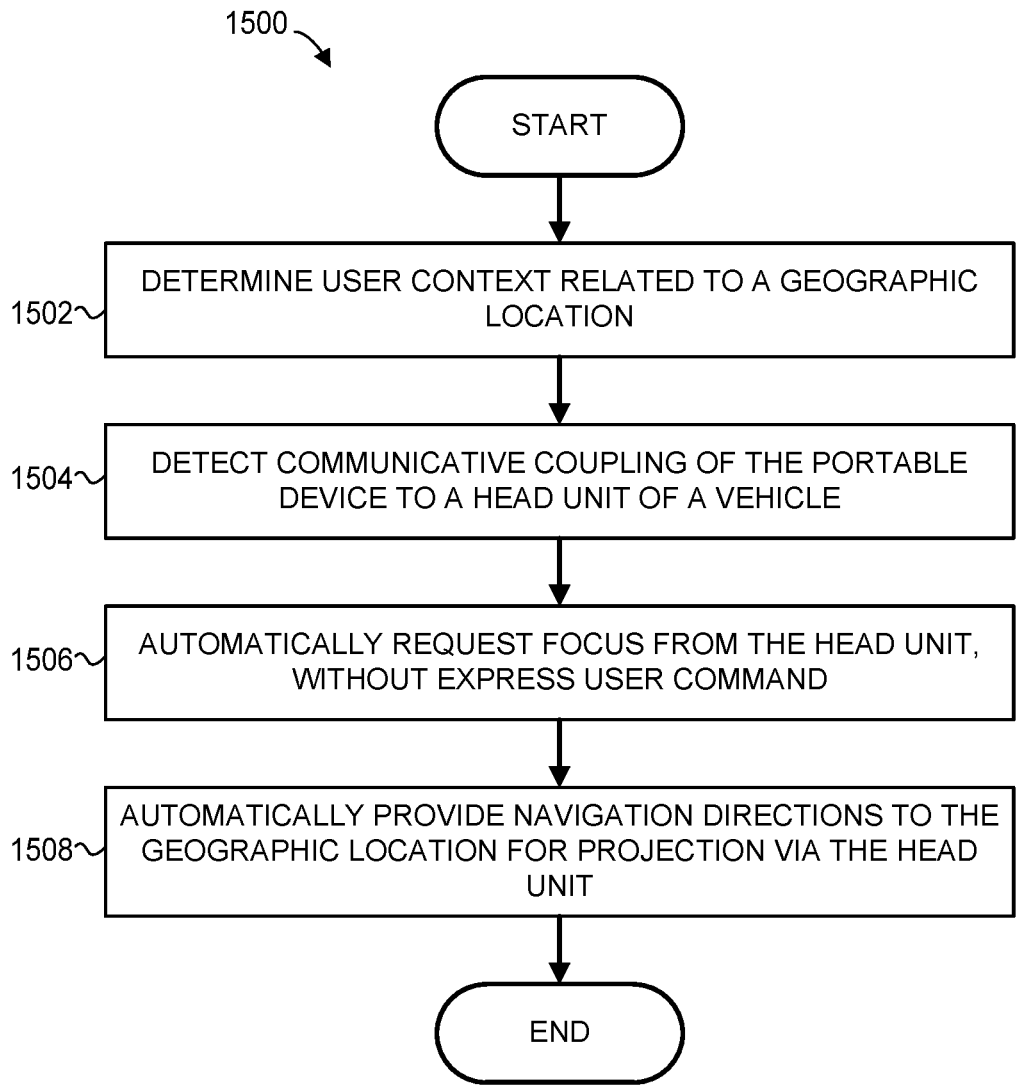
FIG. 16 is a flow diagram of an example method for providing geographic information to head units of vehicles.

FIG. 16 illustrates an example method 1500 for providing geographic information to head units of vehicles, which can be implemented in the protocol sender 122, the geographic/mapping application 126A, or another software component operating in a portable user device. The method 1500 can be implemented as a set of instructions executable on one or more processors and stored on a non-transitory computer-readable medium, such as a flash drive or a hard drive.

The method 1500 begins at block 1502, where a user context related to a geographic location is determined. As discussed above, the context can be determined based on the current activity at a portable device, one or more past activities of the portable device, one or more activities on a peer device, etc.

Next, communicative coupling of the portable device to a head unit of a vehicle is detected (block 1504). In response, a focus is automatically is requested from the head unit (1506). The request for focus can be sent without an express user command. However, according to some implementations, the user previously configures the portable device to automatically request focus in some situations.

At block 1508, navigation directions to the geographic location are projected from the portable device via the head unit. The user in some scenarios may explicitly confirm that the head unit should grant focus to the portable device via the input component of the head unit.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain implementations are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example implementations, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one implementation" or "an implementation" means that a particular element, feature, structure, or characteristic described in connection with the implementation is included in at least one implementation. The appearances of the phrase "in one implementation" in various places in the specification are not necessarily all referring to the same implementation.

Some implementation may be described using the expression "coupled" and "connected" along with their derivatives. For example, some implementations may be described using the term "coupled" to indicate that two or more elements are in direct physical or electrical contact. The term "coupled," however, may also mean that two or more elements are not in direct contact with each other, but yet still co-operate or interact with each other. The implementations are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the implementations herein. This is done merely for convenience and to give a general sense of various implementations. This description should be read to include one or at least one and the singular also includes the plural unless it is obvious that it is meant otherwise.

Upon reading this disclosure, those of ordinary skill in the art will appreciate still additional alternative structural and functional designs for facilitating interactions between a portable device and a head unit of a vehicle through the disclosed principles herein. Thus, while particular implementations and applications have been illustrated and described, it is to be understood that the disclosed implementations are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for providing geographic information to head units of vehicles, the method comprising:
   determining, by one or more processors at a portable device, a user context related to a geographic location, during a session in which a user interacts with a software application executing on the portable device;
   detecting, by the one or more processors, that the portable device has been communicatively coupled to a head unit of a vehicle, wherein the head unit is equipped with a display device, and wherein the session has been deactivated prior to detecting that the portable device has been communicatively coupled to the head unit;
   transmitting to the head unit, without an express user command, a request that the head unit accept data from the portable device for output via the display device; and
   in response to receiving an indication that that the request has been granted, causing, by the one or more processors, information related to the geographic location to be displayed via the display device, without an express user input at the portable device.

2. The method of claim 1, wherein causing the information related to the geographic location to be displayed via the display device includes causing the geographic location to be automatically selected as a destination for navigation directions.

3. The method of claim 1, wherein determining the user context related to a geographic location includes:

providing a digital map via a user interface of the portable device, and receiving a selection of the geographic location via the user interface.

4. The method of claim 1, wherein determining the user context related to the geographic location receiving, via an application executing on the portable device, a search query related to the geographic location.

5. The method of claim 1, wherein determining the user context related to the geographic location detecting that information related to a business at the geographic location is provided via a user interface of the portable device.

6. The method of claim 5, further comprising:

automatically determining a likelihood that a user wishes to navigate to the geographic location;

when the likelihood is above a threshold value, causing the geographic location to be automatically selected as a destination for navigation directions, or when the likelihood is not above the threshold value, causing business information related to the business at the geographic location to be provided via the display device of the head unit.

7. The method of claim 1, further comprising:

transmitting the user context related to the geographic location to a network server; and receiving a selection of the information related to the geographic location from the network server.

8. A portable device comprising:

one or more processors;

an interface configured to couple the portable device to a head unit of a vehicle;

a non-transitory computer-readable memory storing thereon instructions that, when executed on the one or more processors, cause the portable device to:

determine a user context related to a geographic location during a session in which a user interacts with a software application executing on the portable device, determine that the portable device has been communicatively coupled to the head unit of a vehicle via the interface, wherein the head unit is equipped with a display device, wherein the session has been deactivated prior to detecting that the portable device has been communicatively coupled to the head unit, transmit to the head unit, without an express user command, a request that the head unit accept data from the portable device for output via the display device, and in response to receiving an indication that that the request has been granted, cause information related to the geographic location to be displayed via the display device, without an express user input at the portable device.

9. The portable device of claim 8, wherein to cause the information related to the geographic location to be displayed via the display device, the instructions further cause the portable device to:

cause the geographic location to be automatically selected as a destination for navigation directions.

10. The portable device of claim 8, further comprising a user interface; wherein to determine the user context related to a geographic location, the instructions cause the portable device to:

provide a digital map via the user interface, and receive a selection of the geographic location via the user interface.

11. The portable device of claim 8, wherein to determine the user context related to the geographic location the instructions cause the portable device to receive, via an application executing on the portable device, a search query related to the geographic location.

12. The portable device of claim 8, wherein to determine the user context related to the geographic location, the instructions cause the portable device to detect that information related to a business at the geographic location is provided via a user interface of the portable device.

13. The portable device of claim 12, wherein to determine the user context related to the geographic location, the instructions cause the portable device to:

automatically determine a likelihood that a user wishes to navigate to the geographic location;

when the likelihood is above a threshold value, cause the geographic location to be automatically selected as a destination for navigation directions, or when the likelihood is not above the threshold value, cause business information related to the business at the geographic location to be provided via the display device of the head unit.

14. The portable device of claim 8, wherein the instructions further cause the portable device to:

transmit the user context related to the geographic location to a network server; and receive a selection of the information related to the geographic location from the network server.

15. A method for providing geographic information to head units of vehicles, the method comprising:

determining, by one or more processors at a portable device, a user context related to a geographic location, detecting that information related to a business at the geographic location is provided via a user interface of the portable device;

detecting, by the one or more processors, that the portable device has been communicatively coupled to a head unit of a vehicle, wherein the head unit is equipped with a display device;

transmitting to the head unit, without an express user command, a request that the head unit accept data from the portable device for output via the display device; and in response to receiving an indication that that the request has been granted, causing, by the one or more processors, information related to the geographic location to be displayed via the display device, without an express user input at the portable device;

automatically determining a likelihood that a user wishes to navigate to the geographic location;

when the likelihood is above a threshold value, causing the geographic location to be automatically selected as a destination for navigation directions, or when the likelihood is not above the threshold value, causing business information related to a business at the geographic location to be provided via the display device of the head unit.

16. The method of claim 15, further comprising:

transmitting the user context related to the geographic location to a network server; and receiving a selection of the information related to the geographic location from the network server.

* * * * *